(12) United States Patent
Yoshihara et al.

(10) Patent No.: US 12,518,828 B2
(45) Date of Patent: Jan. 6, 2026

(54) MEMORY ARRAY OF THREE-DIMENSIONAL NOR MEMORY STRINGS WITH WORD LINE SELECT DEVICE

(71) Applicant: SUNRISE MEMORY CORPORATION, San Jose, CA (US)

(72) Inventors: Masahiro Yoshihara, Yokohama (JP); Takashi Hirotani, Kanagawa (JP)

(73) Assignee: SUNRISE MEMORY CORPORATION, San Jose, CA (US)

( * ) Notice: Subject to any disclaimer, the term of this patent is extended or adjusted under 35 U.S.C. 154(b) by 100 days.

(21) Appl. No.: 18/629,205

(22) Filed: Apr. 8, 2024

(65) Prior Publication Data
US 2024/0347109 A1    Oct. 17, 2024

Related U.S. Application Data

(60) Provisional application No. 63/495,521, filed on Apr. 11, 2023.

(51) Int. Cl.
| | |
|---|---|
| *G11C 16/04* | (2006.01) |
| *G11C 5/06* | (2006.01) |
| *G11C 16/08* | (2006.01) |
| *H10B 43/10* | (2023.01) |
| *H10B 43/27* | (2023.01) |

(Continued)

(52) U.S. Cl.
CPC .......... *G11C 16/0483* (2013.01); *G11C 5/063* (2013.01); *G11C 16/08* (2013.01); *H10B 43/10* (2023.02); *H10B 43/27* (2023.02); *H10B 51/10* (2023.02); *H10B 51/20* (2023.02); *H10D 30/701* (2025.01); *H10D 64/033* (2025.01); *H10D 64/689* (2025.01); *G11C 11/1673* (2013.01)

(58) Field of Classification Search
CPC .................................................. G11C 11/1673
See application file for complete search history.

(56) References Cited

U.S. PATENT DOCUMENTS

| | | |
|---|---|---|
| 9,515,085 B2 | 12/2016 | Rabkin et al. |
| 9,922,987 B1 | 3/2018 | Mizutani et al. |

(Continued)

OTHER PUBLICATIONS

"PCT Search Report and Written Opinion, PCT/US2024/023726", Jul. 17, 2024, 7 pages.

*Primary Examiner* — Jason Lappas

(57) ABSTRACT

A memory circuit includes an array of thin-film ferroelectric memory transistors formed by an array of NOR memory strings intersecting with local word line structures with global word lines arranged orthogonal to the array of NOR memory strings and aligned with a set of local word line structures provided across multiple stacks of NOR memory strings. The memory circuit includes a word line select transistor associated with each local word line structure to isolate each local word line structure from the associated global word line. The word line select transistor, when activated, selectively couples a selected local word line structure to the associated global word line. Remaining local word line structures associated with the same global word line remain disconnected and therefore not selected. In this manner, parasitic capacitance on the global word line is reduced and unintended disturb to other unselected memory transistors is also reduced.

21 Claims, 29 Drawing Sheets

(51) Int. Cl.
*H10B 51/10* (2023.01)
*H10B 51/20* (2023.01)
*H10D 30/69* (2025.01)
*H10D 64/01* (2025.01)
*H10D 64/68* (2025.01)
*G11C 11/16* (2006.01)

(56) References Cited

U.S. PATENT DOCUMENTS

| | | |
|---|---|---|
| 9,972,640 B1 | 5/2018 | Kai et al. |
| 10,297,610 B2 | 5/2019 | Kai et al. |
| 10,490,568 B2 | 11/2019 | Kai et al. |
| 11,849,578 B2 | 12/2023 | Inoue |
| 2016/0204122 A1 | 7/2016 | Shoji et al. |
| 2017/0062067 A1 | 3/2017 | Yang et al. |
| 2020/0034697 A1* | 1/2020 | Choi .................. G11C 11/1673 |
| 2023/0027837 A1 | 1/2023 | Petti et al. |
| 2023/0081427 A1 | 3/2023 | Chien et al. |

* cited by examiner

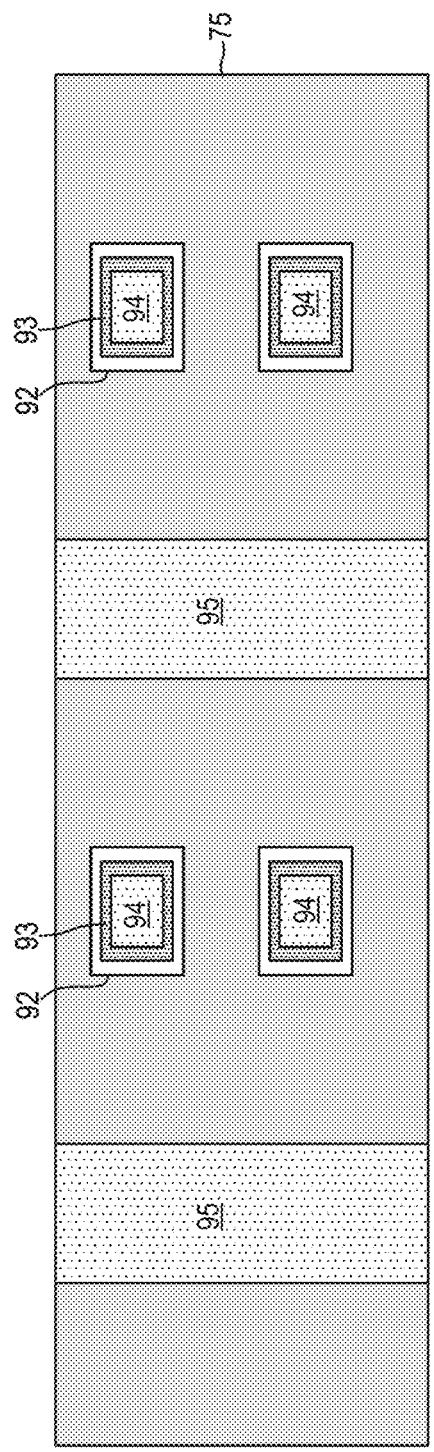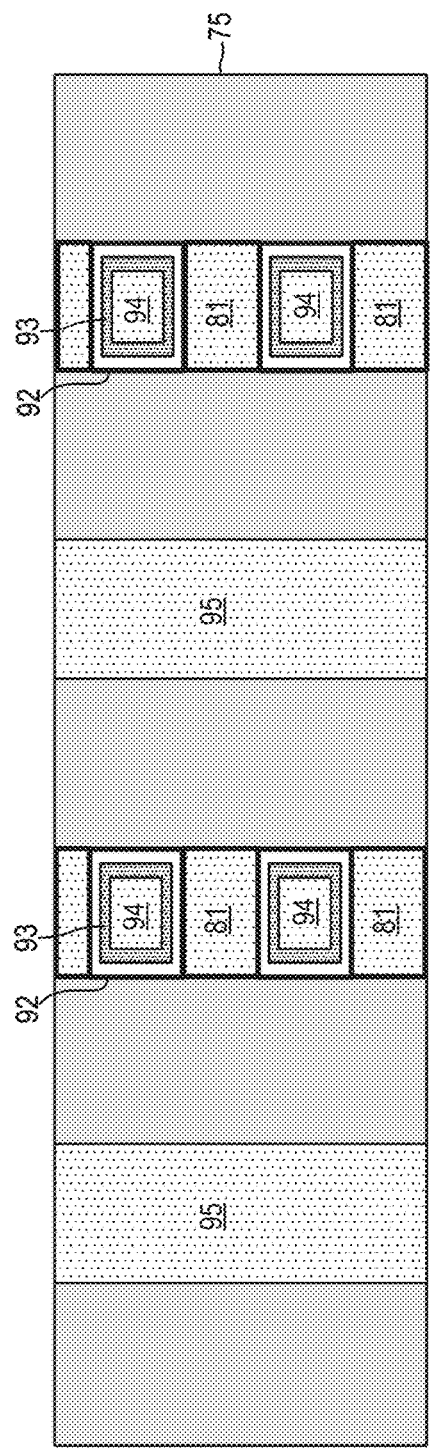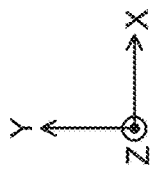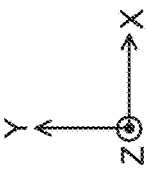
FIG. 7(k1)
FIG. 7(k2)

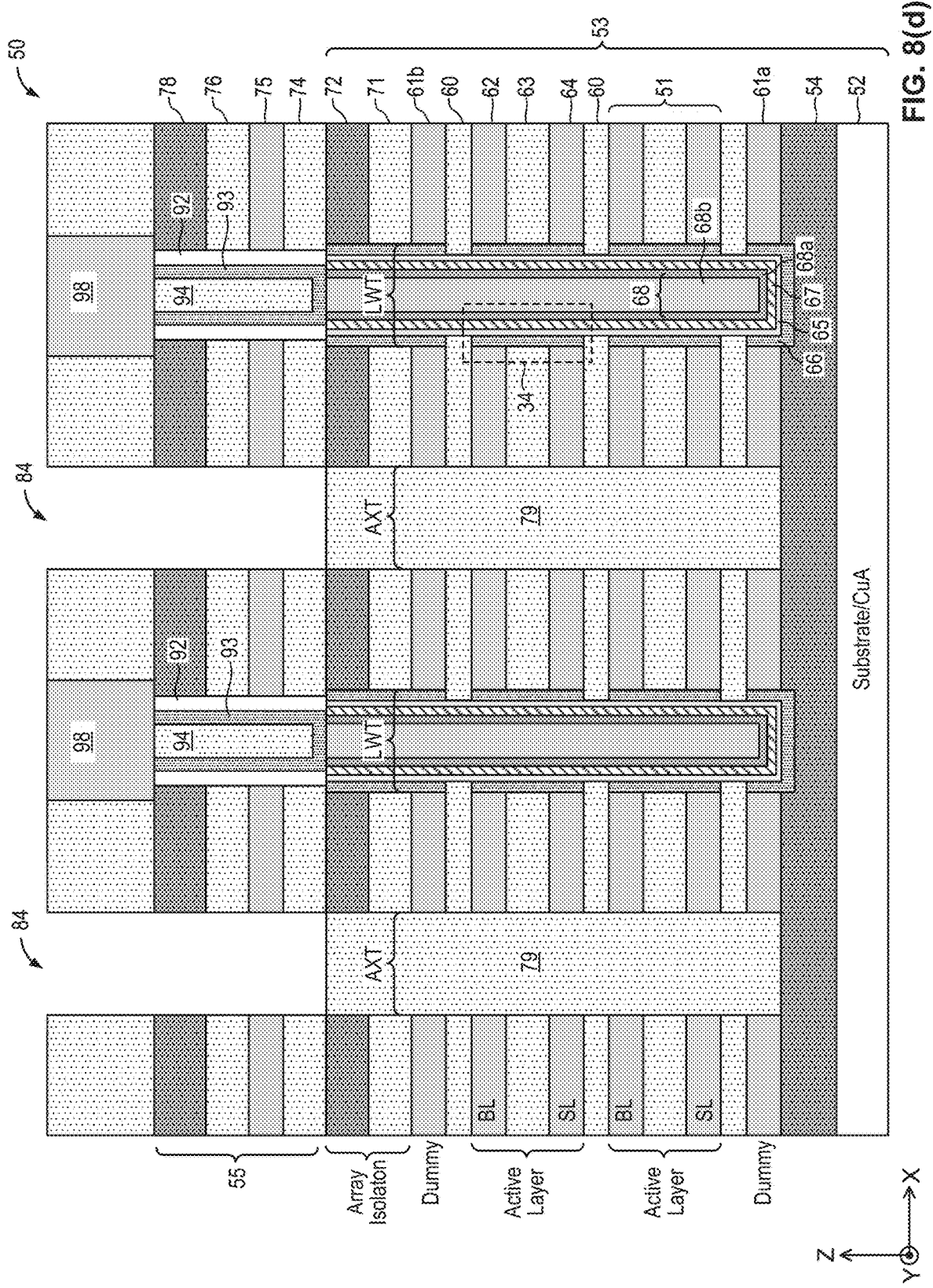

MEMORY ARRAY OF THREE-DIMENSIONAL NOR MEMORY STRINGS WITH WORD LINE SELECT DEVICE

CROSS REFERENCE TO RELATED APPLICATIONS

This application relates and claims priority to U.S. Provisional Patent Application No. 63/495,521, entitled MEMORY ARRAY OF THREE-DIMENSIONAL NOR MEMORY STRINGS WITH WORD LINE SELECT DEVICE, filed Apr. 11, 2023, which is incorporated herein by reference in its entirety for all purposes.

FIELD OF THE INVENTION

The present invention relates to memory circuits and high-density memory structures and fabrication methods thereof. In particular, the present invention relates to a memory array of NOR memory strings with word line select devices.

BACKGROUND OF THE INVENTION

A NOR-type memory string includes storage transistors that share a common source region and a common drain region, where each storage transistor can be individually addressed and accessed. U.S. Pat. No. 10,121,553 (the '553 Patent), entitled "Capacitive-Coupled Non-Volatile Thin-film Transistor NOR Strings in Three-Dimensional Arrays," issued on Nov. 6, 2018, discloses storage transistors (or memory transistors) organized as 3-dimensional arrays of NOR memory strings formed above a planar surface of a semiconductor substrate. The '553 Patent is hereby incorporated by reference in its entirety for all purposes. In the '553 Patent, a NOR memory string includes numerous thin-film storage transistors that share a common bit line and a common source line. In particular, the '553 Patent discloses a NOR memory string that includes (i) a common source region and a common drain region both running lengthwise along a horizontal direction and (ii) gate electrodes for the storage transistors each running along a vertical direction. In the present description, the term "vertical" refers to the direction normal to the surface of a semiconductor substrate, and the term "horizontal" refers to any direction that is parallel to the surface of that semiconductor substrate. In a 3-dimensional array, the NOR memory strings are provided on multiple planes (e.g., 8 or 16 planes) above the semiconductor substrate, with the NOR memory strings on each plane arranged in rows. For a charge-trap type storage transistor, data is stored in each storage transistor using a charge storage film as the gate dielectric material. For example, the charge storage film may include a tunneling dielectric layer, a charge trapping layer and a blocking layer, which can be implemented as a multilayer including silicon oxide or oxynitride, silicon-rich nitride, and silicon oxide, arranged in this order and referred to as an ONO layer. An applied electrical field across the charge storage film adds or removes charge from charge traps in the charge trapping layer, thus altering the threshold voltage of the storage transistor to encode a given logical state in the storage transistor.

Advances in electrically polarizable materials ("ferroelectric materials"), especially those that are being used in semiconductor manufacturing processes, suggest new potential applications in ferroelectric memory circuits. High density memory arrays implemented using 3-dimensional arrays of NOR memory strings of ferroelectric memory transistors have been disclosed in, for example, U.S. patent application Ser. No. 17/936,320, entitled "Memory Structure Including Three-Dimensional NOR Memory Strings Of Junctionless Ferroelectric Memory Transistors And Method Of Fabrication," filed Sep. 28, 2022 ("the '320 application"). The '320 application is hereby incorporated by reference in its entirety for all purposes. The '320 application describes a memory structure that includes randomly accessible ferroelectric memory transistors organized as horizontal NOR memory strings. The NOR memory strings are formed over a semiconductor substrate in multiple scalable memory stacks of thin-film memory transistors. In some examples, the three-dimensional memory stacks are manufactured in a process that includes forming operational trenches for vertical local word lines and forming auxiliary trenches to facilitate back-alley metal replacement and channel separation by a backside selective etch process. Three-dimensional arrays of NOR memory strings of thin-film ferroelectric transistors have also been disclosed in, for example, U.S. patent application Ser. No. 17/812,375, entitled "3-Dimensional Memory String Array Of Thin-Film Ferroelectric Transistors," of Christopher J. Petti et al., filed on Jul. 13, 2022, which application is incorporated herein by reference in its entirety.

SUMMARY OF THE INVENTION

The present disclosure discloses a memory circuit or structure including three-dimensional NOR memory strings of thin-film ferroelectric memory transistors and method of fabrication, substantially as shown in and/or described below, for example in connection with at least one of the figures, as set forth more completely in the claims.

In some embodiments, a memory circuit includes an array of thin-film ferroelectric memory transistors formed by multiple NOR memory strings intersecting with multiple local word line structures, the NOR memory strings being arranged in multiple stacks of vertically aligned NOR memory strings, each memory string including a common drain line and a common source line. The local word line structures of the memory circuit include groups of local word line structures, the local word line structures in each respective group being arranged along the NOR memory strings of at least one stack. Each local word line structure extends vertically along the vertically aligned NOR memory strings in the at least one stack and includes a channel and a gate conductor separated by a ferroelectric gate dielectric layer. The ferroelectric memory transistors are formed at each intersection of a respective local word line structure and the common drain line and the common source line of a respective NOR memory string. The gate conductor of each local word line structure serves as a common gate terminal for the memory transistors in the vertically aligned NOR memory strings in the respective stack intersecting the respective local word line structure.

The memory circuit includes global word lines arranged orthogonal to the NOR memory strings, each global word line being aligned with a set of local word line structures provided across the multiple stacks. The memory circuit further includes word line select transistors including groups of word line select transistors, each group being arranged along the NOR memory strings of the stacks. Each word line select transistors is provided between a respective local word line structure and an associated global word line and includes a source terminal being the gate conductor of the associated local word structure, a drain terminal coupled to the associated global word line, and a gate terminal coupled to receive a respective select gate signal. Each group of word line select transistors is controlled by the same select gate signal. In response to a global word line being asserted to select a set of local word line structures associated therewith, a respective group of word line select transistors is activated by the respective select gate signal to electrically connect the asserted global word line to the common gate terminal of the associated local word line structure to activate one local word line structure in the set of local word line structures.

In other embodiments, a three-dimensional memory structure formed above a planar surface of a semiconductor substrate includes an array of thin-film ferroelectric memory transistors being organized as stacks of NOR memory strings, each stack being separated from each of its immediately neighboring stacks along a first direction by a trench, the stacks extending along a second direction substantially parallel to the planar surface of the semiconductor substrate, and the NOR memory strings of each stack being provided one on top of another along a third direction substantially normal to the planar surface. Each NOR memory string includes a common drain layer formed spaced apart from a common source layer, local word line structures being provided in contact with the stacks of NOR memory strings and arranged spaced apart in the second direction, each local word line structure extending in the third direction and including a channel layer in contact with the NOR memory strings in the associated stack, a ferroelectric gate dielectric layer formed adjacent the channel layer and a gate conductor layer provided in the local word line structures adjacent the ferroelectric gate dielectric layer. The gate conductor layer of each local word line structure serves as a common gate terminal for the ferroelectric memory transistors in the NOR memory strings in a respective stack associated with the local word line structure.

The memory structure further includes word line select transistors, each word line select transistor being associated with a given local word line structure. Each word line select transistor includes a source terminal being the gate conductor layer of the associated local word structure, a drain terminal coupled to one of multiple global word lines, and a gate terminal coupled to receive a respective select gate signal. In response to a first global word line being asserted to select a set of local word line structures associated therewith, a first word line select transistor is activated by a first select gate signal to electrically connect the asserted first global word line to the common gate terminal of the associated local word line structure to activate one local word line structure in the set of local word line structures.

These and other advantages, aspects and novel features of the present invention, as well as details of an illustrated embodiment thereof, will be more fully understood from the following description and drawings.

BRIEF DESCRIPTION OF THE DRAWINGS

Various embodiments of the invention are disclosed in the following detailed description and the accompanying drawings. Although the drawings depict various examples of the invention, the invention is not limited by the depicted examples. It is to be understood that, in the drawings, like reference numerals designate like structural elements. Also, it is understood that the depictions in the figures are not necessarily to scale.

FIGS. 8(a) to 8(f) illustrate an alternate process for performing the select gate separation in alternate embodiments.

DETAILED DESCRIPTION OF THE INVENTION

Figures 1, 1A:
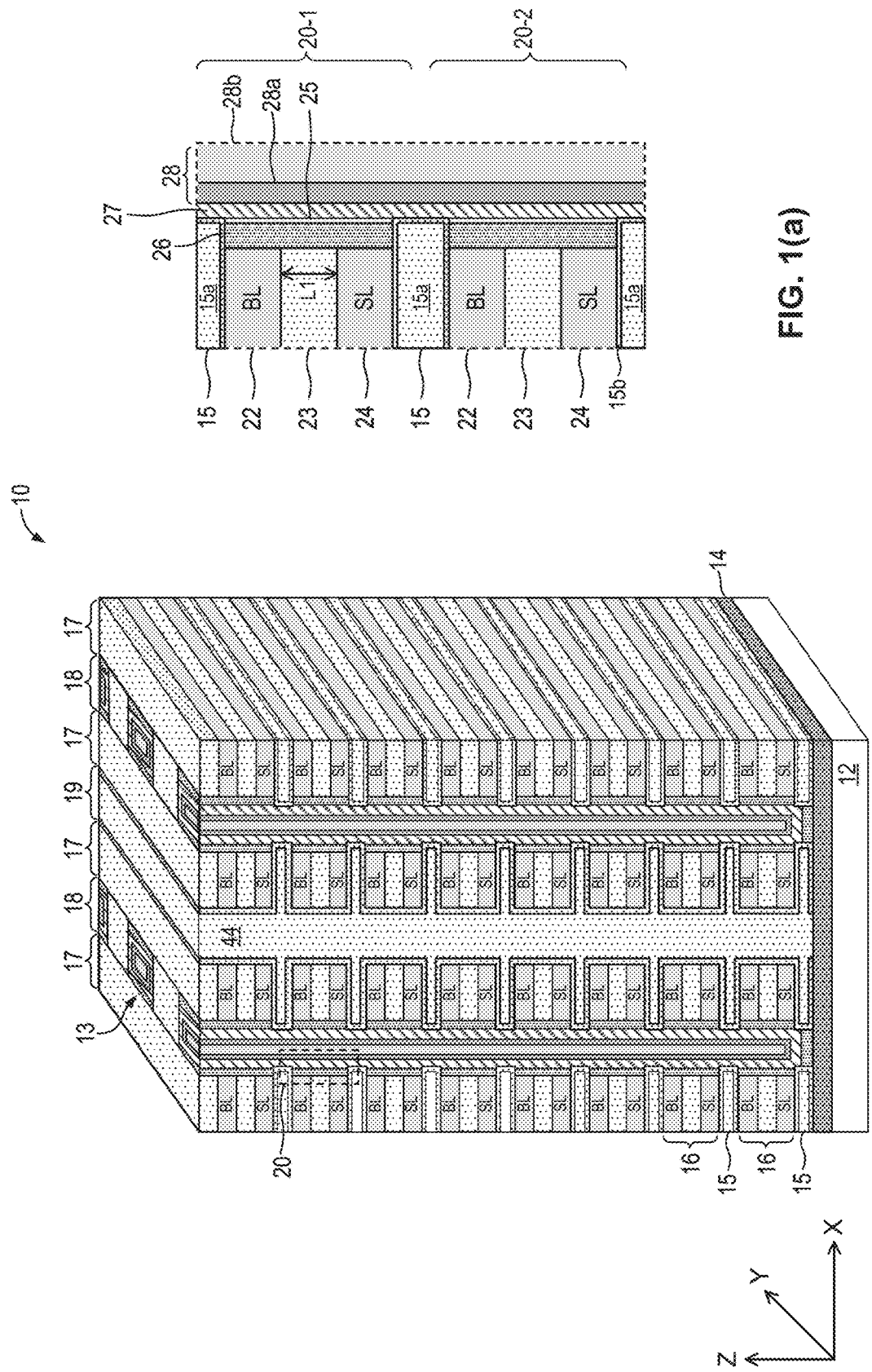
FIG. 1, which includes
FIG. 1(a), is a perspective view of a memory structure including a 3-dimensional array of NOR memory strings in some embodiments.

In embodiments of the present invention, a memory circuit includes an array of thin-film ferroelectric memory transistors formed by an array of NOR memory strings intersecting with local word line structures with global word lines arranged orthogonal to the array of NOR memory strings and aligned with a set of local word line structures provided across multiple stacks of NOR memory strings. The memory circuit includes a word line select transistor associated with each local word line structure to isolate each local word line structure from the associated global word line. The word line select transistor, when activated, selectively couples a selected local word line structure to the associated global word line. Remaining local word line structures associated with the same global word line remain disconnected and therefore not selected. By connecting only a subset of the local word line to an asserted global word line, parasitic capacitance on the global word line is reduced and unintended disturb to other unselected memory transistors is also reduced. By reducing the parasitic capacitance on the global word lines, the time to charge up the global word line can be reduced which shorten the latency of memory device.

In some embodiments, the word line select device is a vertical thin-film transistor formed above the array of memory stacks and is referred herein as a "word line select transistor." Furthermore, in some embodiments, the word line select transistors are non-memory transistors and have gate electrodes formed using the conductive layer used to form the common bit lines of the NOR memory strings.

In embodiments of the present invention, the ferroelectric memory transistors are thin-film ferroelectric field-effect transistors (FeFETs) having a ferroelectric polarization layer as a gate dielectric layer. The ferroelectric polarization layer, also referred to as a "ferroelectric gate dielectric layer", is formed adjacent to an oxide semiconductor layer as a channel region. The ferroelectric memory transistors include source and drain regions—both formed of a metallic conductive material—in electrical contact with the oxide semiconductor channel region. The ferroelectric memory transistors thus formed are each a junctionless transistor without a p/n junction in the channel and in which the threshold voltage is changed by the polarization of the ferroelectric dielectric layer which in turn modulates the mobile carriers in the oxide semiconductor channel layer. In the memory structure of the present invention, the ferroelectric memory transistors in each NOR memory string are controlled by individual control gate electrodes formed in the local word line structures to allow each memory transistor to be individually addressed and accessed. In some embodiments, the ferroelectric polarization layer is formed of a doped hafnium oxide material and the oxide semiconductor channel region is formed of an amorphous metal oxide semiconductor material.

In the present description, the term "storage transistor" is used interchangeably with "memory transistor" to refer to the transistor device formed in the memory structure described herein. In some examples, the memory structure of the present disclosure including NOR memory strings of randomly accessible memory transistors (or memory transistors) can have applications in computing systems as the main memory where the memory locations are directly accessible by the processors of the computer systems, for instance, in a role served in the prior art by conventional random-access memories (RAMs), such as dynamic RAMs (DRAMS) and static RAMs (SRAMs). For example, the memory structure of the present disclosure can be applied in computing systems to function as a random-access memory to support the operations of microprocessors, graphical processors and artificial intelligence processors. In other examples, the memory structure of the present disclosure is also applicable to form a storage system, such as a solid-state drive or replacing a hard drive, for providing long term data storage in computing systems.

In the present description, the term "oxide semiconductor layer" (sometimes also referred to as a "semiconductor oxide layer" or "metal oxide semiconductor layer") as used herein refers to thin film semiconducting materials made from a conductive metal oxide, such as zinc oxide and indium oxide, or any suitable conductive metal oxides with charge-carriers having mobilities that can be modified or modulated using suitable preparation or inclusion of suitable impurities.

In embodiments of the present invention, the memory device includes memory stacks (also referred to as "stacks") where each memory stack includes multiple NOR memory strings formed one on top of another in the vertical direction. In some embodiments, the stacks of NOR memory strings are formed by groups of thin films successively deposited over a planar surface of a semiconductor substrate, each group of thin films being referred to as an "active layer" in the present description. The active layers in each stack of NOR memory strings are provided one on top of another and each active layer is separated from the other active layers by an inter-layer isolation layer. Each active layer includes a common drain line and a common source line that are arranged spaced apart in the vertical direction by a channel spacer isolation layer. Both the common source line and the common drain line extend along a horizontal direction.

The memory transistors in each NOR memory string share the common source line and the common drain line. In some examples, the channel layer, the gate dielectric layer and gate conductor layer of the memory transistors are formed in a vertical direction in contact with the common source line and the common drain line of each NOR memory string. Memory transistors are thus formed in multiple parallel planes of each stack, a memory transistor being formed at each intersection of a gate conductor layer and the common source line and the common drain line of a memory string. The gate conductor layers are referred herein as the local word lines (LWL). As mentioned above, the term "vertical" refers to the direction normal to the surface of a semiconductor substrate, and the term "horizontal" refers to any direction that is parallel to the surface of that semiconductor substrate. Furthermore, as used herein and to be described in more details below, a "local word line structure" refers to the columnar structure in which the channel layer, the gate dielectric layer and the gate conductor are formed. The memory transistor is formed at each intersection of the local word line structure and the common source line and the common drain line of a memory string. In some examples, the local word lines are formed in operational trenches between the memory stacks and the operational trenches are sometimes referred herein as "local word line trenches" or "LWL trenches". That is, the operational or local word line trenches are trenches in which the local word line gate conductors are formed and in which memory transistors are fabricated.

In the present embodiments, the memory transistors in the NOR memory strings are ferroelectric field effect transistors including a ferroelectric thin film as the gate dielectric layer, also referred to as the ferroelectric polarization layer or ferroelectric gate dielectric layer or ferroelectric dielectric layer. In a ferroelectric field effect transistor (FeFET), the polarization direction in the ferroelectric gate dielectric layer is controlled by an electric field applied between the transistor drain terminal and the transistor gate electrode, where changes in the polarization direction alters the threshold voltage of the FeFET. In some embodiments, the electric field is applied to both the transistor drain and source terminals, relative to the transistor gate electrode. For example, the FeFET may be programmed to have either one of two threshold voltages, where each threshold voltage of the FeFET can be used to encode a given logical state. For example, the two threshold voltages of the FeFET can be used to encode a "programmed" state and an "erased" state, each representing a designated logical value. In one example, the programmed state is associated with a higher threshold voltage and the erased state is associated with a lower threshold voltage. In some embodiments, more than two threshold voltages may be established to represent more than two memory states at each FeFET.

In the present description, to facilitate reference to the figures, a Cartesian coordinate reference frame is used, in which the Z-direction is normal to the planar surface of the semiconductor substrate and the X-direction and the Y-directions are orthogonal to the Z-direction and to each other, as indicated in the figures. Moreover, the drawings provided herein are idealized representations to illustrate embodiments of the present disclosure and are not meant to be actual views of any particular component, structure, or device. The drawings are not to scale, and the thickness and dimensions of some layers may be exaggerated for clarity. Variations from the shapes of the illustrations are to be expected. For example, a region illustrated as a box shape may typically have rough and/or nonlinear features. Sharp angles that are illustrated may be rounded. Like numerals refer to like components or elements throughout.

FIG. 1, which includes FIG. 1(a), is a perspective view of a memory structure including a 3-dimensional array of NOR memory strings in some embodiments. The memory structure can be used to implement part of a semiconductor memory device in some examples. In some embodiments, the semiconductor memory device is constructed using three-dimensional arrays of NOR memory strings of ferroelectric memory transistors formed over a semiconductor substrate, as described in the aforementioned '320 application. Referring to FIG. 1, a memory structure 10 includes a number of active layers 16 formed on a planar surface of a semiconductor substrate 12. An insulating layer 14 may be provided between the semiconductor substrate 12 and the active layers 16 formed on the substrate. The active layers 16 are formed one on top of another in the Z-direction (i.e., along a direction normal to the planar surface of the substrate 12) and separated from each other by an inter-layer isolation layer 15. The active layers 16 are divided in the X-direction into narrow strips ("active strips") that are stacked one on top of another to form stacks 17 of active strips ("active stacks") extending in the Y-direction. The active stacks 17 are also referred to as memory stacks in the present description.

In the present embodiment, the active stacks 17 of the memory structure 10 are separated by narrow trenches including operational trenches 18 (also referred to as "LWL trenches") and auxiliary trenches 19. In particular, the active stacks 17 are separated by alternating operational trenches 18 and auxiliary trenches 19. In the present description, operational trenches 18 are narrow trenches between active stacks 17 in which local word line structures are provided and memory transistors are formed. Auxiliary trenches 19 are narrow trenches between active stacks 17 where no memory transistors are formed.

Each active layer 16 includes first and second low resistivity conductive layers (e.g., titanium nitride (TiN)-lined tungsten (W) layers) separated by a channel spacer dielectric layer (e.g., silicon oxide). During intermediate processing steps, the active layer may include sacrificial layers (e.g., silicon nitride) to be subsequently replaced by conductive layers. Subsequent processing steps form the channel layers, the gate dielectric layers, and the gate conductor layers in the operational trenches 18 between the separated active stacks. The gate conductor layers and the gate dielectric layers, and sometimes the channel layer, are formed as columnar structures extending in the Z-direction. In the present description, the gate conductor layers are also referred to as "local word lines" and the gate conductor layer with a gate dielectric layer and with the channel layer is collectively referred to a local word line (LWL) structure 13. The first and second conductive layers of each active strip form a drain region ("common drain line" or "common bit line") and a source region ("common source line"), respectively, of the memory transistors. In the present embodiment, the memory transistors are formed along the vertical side of the active stacks 17 facing the operational trenches 18. In particular, a memory transistor 20 is formed at the intersection of an active strip with an LWL structure 13. The local word line structures 13 in each trench 18 are separated from each other by a dielectric-filled shaft in the Y-direction.

FIG. 1(a) illustrates the detail construction of the memory transistor 20 formed in the memory structure 10 in some embodiments. In particular, FIG. 1(a) illustrates a pair of memory transistors 20-1 and 20-2 in two adjacent planes of an active stack 17, also referred to as a memory stack. Referring to FIG. 1(a), the memory transistor 20 includes a first conductive layer 22 forming the drain region (the common drain line or the common bit line) and a second conductive layer 24 forming the source region (the common source line), the conductive layers being spaced apart by the channel spacer dielectric layer 23. The memory transistor 20 further includes the channel layer 26, the gate dielectric layer 27 and the gate conductor layer 28 that are formed on the sidewall of the memory stack. The channel layer 26 is formed vertically along the sidewall of the memory stack and in contact with both the first conductive layer 22 and the second conductive layer 24. The memory transistor 20 is isolated from adjacent memory transistors in the memory stack by an inter-layer isolation layer 15. As thus configured, along each active strip (in the Y-direction), the memory transistors that share the common source line and the common bit line form a NOR memory string (referred herein as a "Horizontal NOR memory string" or "HNOR memory string").

In embodiments of the present invention, the memory transistors in the memory structure 10 are junctionless ferroelectric memory transistors. Accordingly, each memory transistor 20 includes only conductive layers as the source and drain regions, without any semiconductor layers. The first and second conductive layers are formed using a low resistivity metallic conductive material. In some embodiments, the first and second conductive layers are metal layers, such as a titanium nitride (TiN)-lined tungsten (W) layer, a titanium nitride (TiN)-lined molybdenum (Mo) layer, a tungsten nitride (WN)-lined tungsten (W) layer, a molybdenum nitride (MoN) lined molybdenum (Mo) layer, or a liner-less tungsten or molybdenum or cobalt layer, or other metal layers. The channel spacer dielectric layer 23 between the first and second conductive layers may be a silicon dioxide ($SiO_2$) layer. The channel layer 26 is an oxide semiconductor layer. In some examples, the channel layer 26 is formed using an amorphous oxide semiconductor material, such as indium gallium zinc oxide (InGaZnO or IGZO), indium zinc oxide (IZO), indium tungsten oxide (IWO), or indium tin oxide (ITO), or other such oxide semiconductor materials. An oxide semiconductor channel region has the advantage of a high mobility for greater switching performance and without concern for electron or hole tunneling. For example, an IGZO film has an electron mobility of 10.0-100.0 $cm^2/V$, depending on the relative compositions of indium, gallium, zinc and oxygen.

To form the ferroelectric memory transistor, the memory transistor 20 includes a ferroelectric gate dielectric layer or ferroelectric polarization layer 27 in contact with the channel layer 26. The ferroelectric polarization layer 27 serves as the storage layer of the memory transistor. The ferroelectric polarization layer can be deposited using an atomic layer deposition (ALD) technique and may have a thickness between 1 nm to 14 nm. In some embodiments, an interfacial layer 25 may be provided between the oxide semiconductor channel layer 26 and the ferroelectric polarization layer 27. The interfacial layer 25 is a thin layer and may be 0.5 nm to 4 nm thick. In some embodiments, the interfacial layer is formed using a material with a high dielectric constant (K) (also referred to as a "high-K" material). In some embodiments, the interfacial layer 25 may be a silicon nitride ($Si_3N_4$) layer, or a silicon oxynitride layer, or an aluminum oxide ($Al_2O_3$) layer. In one example, the interfacial layer, if present, may have a thickness of 1.5 nm while the ferroelectric polarization layer has a thickness of 4-5 nm. The inclusion of the interfacial layer 25 in FIG. 1(a) is illustrative only and not intended to be limiting. The interfacial layer 25 is optional and may be omitted in other embodiments of the present invention. In other embodiments, the interfacial layer 25, when included, may be formed as a multi-layer of different dielectric materials. In the present description, a material with a high dielectric constant or a high-K material refers to a material with a dielectric constant larger than the dielectric constant of silicon dioxide ($SiO_2$).

In some embodiments, the ferroelectric polarization layer is formed of a doped hafnium oxide material, such as zirconium-doped hafnium oxide (HfZrO or "HZO"). In other embodiments, the hafnium oxide can be doped with silicon (Si), iridium (Ir) or lanthanum (La). In some embodiments, the ferroelectric polarization layer is a material selected from: zirconium-doped hafnium oxide (HZO), silicon-doped hafnium oxide (HSO), aluminum zirconium-doped hafnium oxide (HfZrAlO), aluminum-doped hafnium oxide ($HfO_2$:Al), lanthanum-doped hafnium oxide ($HfO_2$:La), hafnium zirconium oxynitride (HfZrON), hafnium zirconium aluminum oxide (HfZrAlO), and any hafnium oxide that includes zirconium impurities.

The ferroelectric polarization layer contacts the channel layer 26 on one side and the gate conductor layer 28 on the opposite side. In some embodiments, the gate conductor layer 28 includes a conductive liner 28a as an adhesion layer and a low resistivity conductor 28b. In some examples, the conductive liner 28a is a titanium nitride (TiN) layer, a tungsten nitride (WN) layer, or a molybdenum nitride (MoN), and the conductor 28b is formed using tungsten or molybdenum, or other metals. In some cases, the conductive liner 28a is not needed and the gate conductor layer 28 includes only the low resistivity conductor 28b, such as a liner-less tungsten or molybdenum layer. In another example, the gate conductor layer 28 can be formed using titanium nitride (TiN) alone as the low resistivity conductor 28b. In other examples, the conductor 28b can be heavily doped n-type or p-type polysilicon, which can be used with or without the conductive liner. The gate conductor layer 28, including the conductive liner 28a (if any) and the conductor 28b, together forms the control gate electrode of the memory transistor and functions as the local word line in the memory structure.

As thus constructed, the oxide semiconductor channel layer 26 forms an N-type, unipolarity channel region where the conductive layers 22, 24, forming the drain and source terminals, directly contact the channel region. The ferroelectric memory transistor thus formed is a depletion mode device where the transistor is normally on (i.e., conducting) and can be turned off (i.e., non-conducting) by depleting the N-type carriers in the channel region. The threshold voltage of the ferroelectric memory transistor is a function of the thickness (X-direction) of the oxide semiconductor channel layer 26. That is, the threshold voltage of the ferroelectric memory transistor is the amount of voltage necessary to deplete the carriers within the thickness of the oxide semiconductor channel region to shut off the ferroelectric memory transistor.

Each memory transistor 20 is isolated from adjacent memory transistors along an active stack (in the Z-direction) by the inter-layer isolation layer 15. In the present embodiment, the inter-layer isolation layer 15 is a dielectric layer, such as silicon dioxide ($SiO_2$) or other dielectric material with similar dielectric constant. In some cases, the inter-layer isolation layer 15 may include an optional liner 15b to cover or passivate the exposed surfaces of the active strips and then the remaining volume is filled with a dielectric layer 15a. In some embodiments, the air gap liner 15b is a silicon nitride layer or an aluminum oxide ($Al_2O_3$) layer. The air gap liner 15b may be 1 nm-3 nm thick. In FIG. 1(a), elements are sometimes exaggerated in size for illustrative purposes only. It is understood that the depictions in this and other figures are not necessarily to scale. In embodiments of the present invention, the inter-layer isolation layer 15 is also used to provide physical separation between the channel layer 26 of one memory transistor and the channel layer of the memory transistors above or below it in the same memory stack, thereby providing isolation of each memory transistor in a memory stack.

In other embodiments of the present invention, the inter-layer isolation layer 15 is implemented as an air gap isolation formed by an air gap cavity and an optional air gap liner. For example, the inter-layer isolation layer 15 may include an air gap liner 15b with the remaining cavities forming air gap isolation cavities 15a. The air gap liner 15b is a dielectric layer used to cover or passivate the exposed surface of the air gap cavities 15a. As thus formed, the air gap cavities 15a function as the inter-layer isolation layer 15 to provide effective isolation between adjacent memory transistors 20 along a memory stack.

Returning to FIG. 1, in the exemplary embodiment as shown, the memory structure 10 includes a dielectric layer 44 which fills the auxiliary trenches 19 outside of the inter-layer isolation layer 15. In some embodiments, the dielectric layer 44 is a dielectric layer, such as a silicon dioxide ($SiO_2$) layer. In other embodiments, the auxiliary trenches 19 may be capped by a dielectric capping layer with the remaining cavities used to form air gap cavities.

In embodiments of the present invention, the three-dimensional array of NOR memory strings of ferroelectric memory transistors can be applied to implement a non-volatile memory device or a quasi-volatile memory device. For example, a quasi-volatile memory has an average retention time of greater than 100 ms, such as about 10 minutes or a few hours, whereas a non-volatile memory device may have a minimum data retention time exceeding 5 years. As a quasi-volatile memory, the ferroelectric memory transistor 20 may require refresh from time to time to restore the intended programmed and erased polarization states. For example, the ferroelectric memory transistors 20 in memory structure 10 may be refreshed every few minutes or hours. In particular, the ferroelectric memory transistors in the present disclosure can form a quasi-volatile memory device where the refresh intervals can be on the order of hours, significantly longer than the refresh intervals of DRAMs which require much more frequent refreshes, such as in tens of milliseconds.

It is instructive to note that the memory structure described herein is provided to illustrate an exemplary memory structure of three-dimensional array of NOR memory strings of ferroelectric memory transistors. The memory structure 10 shown in FIGS. 1 and 1(a) is illustrative only and not intended to be limiting. One of ordinary skill in the art, after being apprised of the present disclosure, would appreciate that the word line select device of the present disclosure can be applied to other memory structures of three-dimensional array of NOR memory strings of ferroelectric memory transistors.

Referring again to FIG. 1, to complete the memory circuit, various types of circuitry are formed in or at the surface of the semiconductor substrate 12 to support the operations of the HNOR memory strings. Such circuits are referred to as "circuits under array" ("CuA") and may include digital and analog circuitry such as decoders, drivers, sense amplifiers, sequencers, state machines, exclusive OR circuits, memory caches, multiplexers, voltage level shifters, voltage sources, latches and registers, and connectors, that execute repetitive local operations such as processing random address and executing activate, erase, program, read, and refresh commands with the memory arrays formed above the semiconductor substrate 12. In some embodiments, the transistors in the CuA are built using a process optimized for the control circuits, such as an advanced manufacturing process that is optimized for forming low-voltage and faster logic circuits. In some embodiments, the CuA is built using fin field-effect transistors (FinFET) or gate-all-around field-effect transistors (GAAFET) to realize a compact circuit layer and enhanced transistor performance.

In some embodiments, the CuA provides the data path to and from the memory array and further to a memory controller that may be built on the same semiconductor substrate as the CuA. Alternatively, the memory controller may reside on a separate semiconductor substrate, in which case the CuA and the associated data path are electrically connected to the memory controller using various bonding techniques. In some examples, the memory controller includes control circuits for accessing and operating the memory transistors in the memory array connected thereto, performing other memory control functions, such as data routing and error correction, and providing interface functions with systems interacting with the memory array.

The memory structure 10 of FIG. 1 illustrates a construction of a 3-dimensional array of NOR memory strings in some embodiments. In some embodiments, the memory structure 10 is fabricated in a process that realizes advantageous features for the memory structure. First, the memory structure 10 is formed so that the memory transistors in the 3-dimensional array of NOR memory strings are individually isolated from other memory transistors. In particular, each memory transistor is isolated in the vertical direction by the inter-layer isolation layer and also isolated in the horizontal direction by isolating the channel layer to each local word line structure 13, as shown in FIG. 1. The performance characteristics of the memory transistors can be enhanced by individually isolating each memory transistors. Second, the channel layer is deposited conformally as part of the local word line structure 13 and then channel separation between active layers in the memory stacks is realized by etching the channel backside through access openings formed by a sacrificial layer. This results in a simplified and more reliable process for forming the channel layer. Third, after the removal of the inter-layer sacrificial layer for channel separation, the remaining cavities between active layers can form air gap isolation between the active layers, realizing better isolation than most dielectric materials.

In embodiments of the present disclosure, the memory structure includes a memory array portion constructed as described above to form the 3-dimensional array of NOR memory strings. To complete the memory device, the memory structure includes staircase portions provided at the ends of the memory strings (in the Y-directions). The thin-film memory transistors of the NOR memory strings are formed in the memory array portion while the staircase portions, on opposite sides of the array portion, include staircase structures to provide connections through conductive vias to the common bit lines and, optionally, the common source lines, of the NOR memory strings. In some embodiments, the common source lines are pre-charged to serve as virtual voltage reference source during programming, reading and erase operations, thereby obviating the need for a continuous electrical connection with the support circuitry during such operations. In the present description, the common source lines are described as being electrically floating to refer to the absence of a continuous electrical connection to the common source lines. In embodiments of the present disclosure, various processing steps for forming staircase structures in the memory structure can be used. The processing steps for forming the staircase structures can be before, after, or interleaved with the processing steps for forming the memory array portion.

The memory structure 10 of FIG. 1 illustrates the construction of a memory array including a three-dimensional array of NOR memory strings. The memory structure 10 can be used as a building block for forming a high capacity, high density memory device. In embodiments of the present disclosure, the memory structure 10 represents a modular memory unit, referred to as a "tile," and a memory device is formed using an array of the modular memory units. In one exemplary embodiment, a memory device is organized as a two-dimensional array of tiles, arrayed along the X- and Y-directions, where each tile includes a three-dimensional array of ferroelectric memory transistors with support circuitry for each tile formed under the respective tile. More specifically, a memory device includes multiple memory arrays of thin-film ferroelectric memory transistors organized as a 2-dimensional array of "tiles" (i.e., the tiles are arranged in rows and columns) formed above a planar semiconductor substrate. Each tile can be configured to be individually and independently addressed or larger memory segments (e.g., a row of tiles or a 2-dimensional block of tiles) may be created and configured to be addressed together.

As thus configured, the memory device described herein implements a tile-based architecture including an arrangement of independently and concurrently operable arrays or tiles of memory transistors where each tile includes memory transistors that are arranged in a three-dimensional array supported by a localized modular control circuit operating the memory transistors in the tile. The tile-based architecture enables concurrent memory access to multiple tiles in the memory device, which enables independent and concurrent memory operations to be carried out across multiple tiles. The tile-based concurrent access to the memory device has the benefits of increasing the memory bandwidth and lowering the tail latency of the memory device by ensuring high availability of memory transistors.

In embodiments of the present invention, the memory device is constructed to include word line select transistors to connect the local word lines (that is, the gate conductor layers in the local word line structures) to the global word lines. The word line select transistors are used to select or activate only the relevant local word lines out of all the local word lines that are connected to a global word line. In this manner, the parasitic capacitance on the global word line is reduced and the latency of the memory device is improved.

Figure 2:
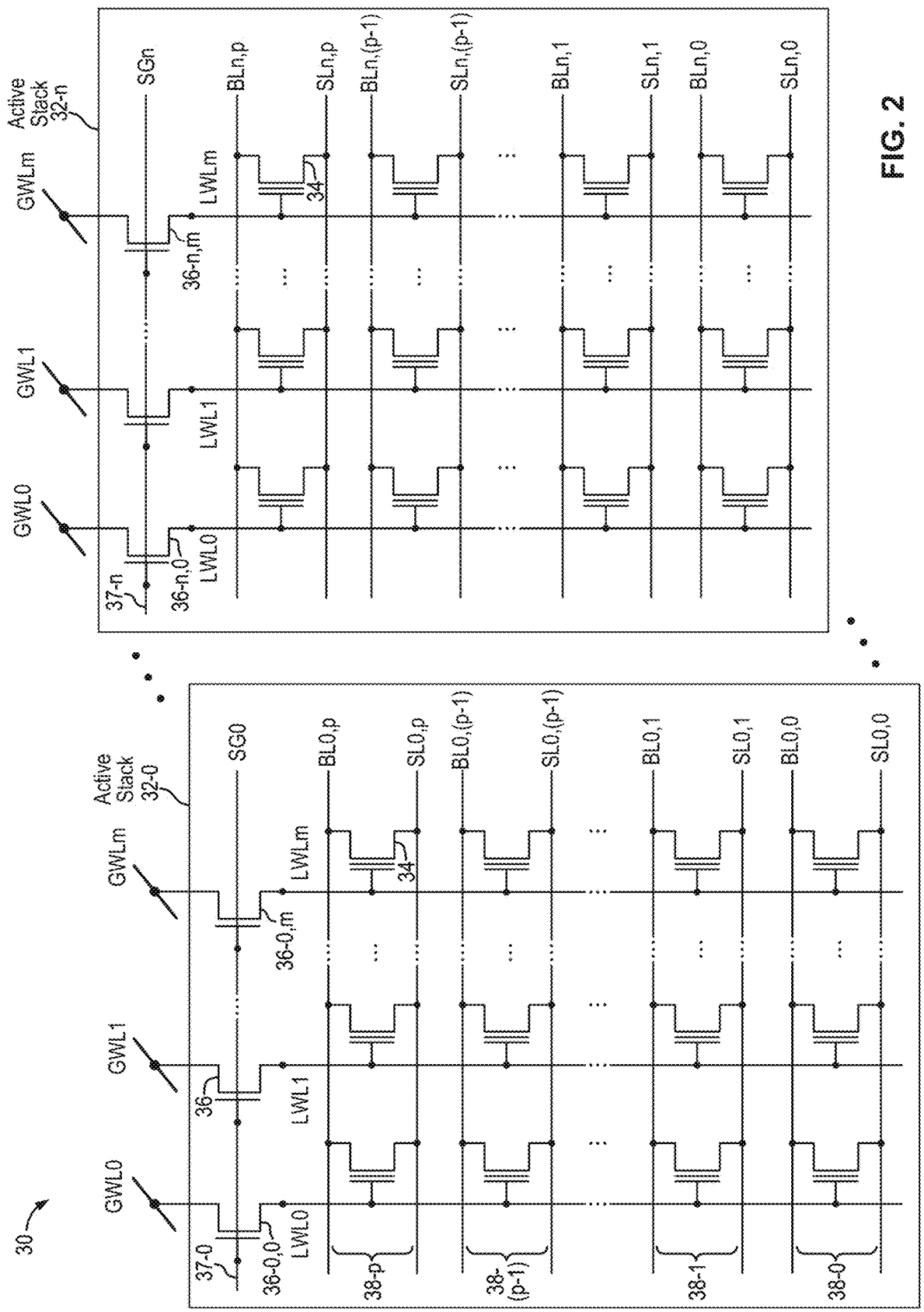
FIG. 2 is a scheme diagram illustrating a memory circuit incorporating local word line select transistors that can be constructed using the memory structure of FIG. 1 in some embodiments.
Figure 3:
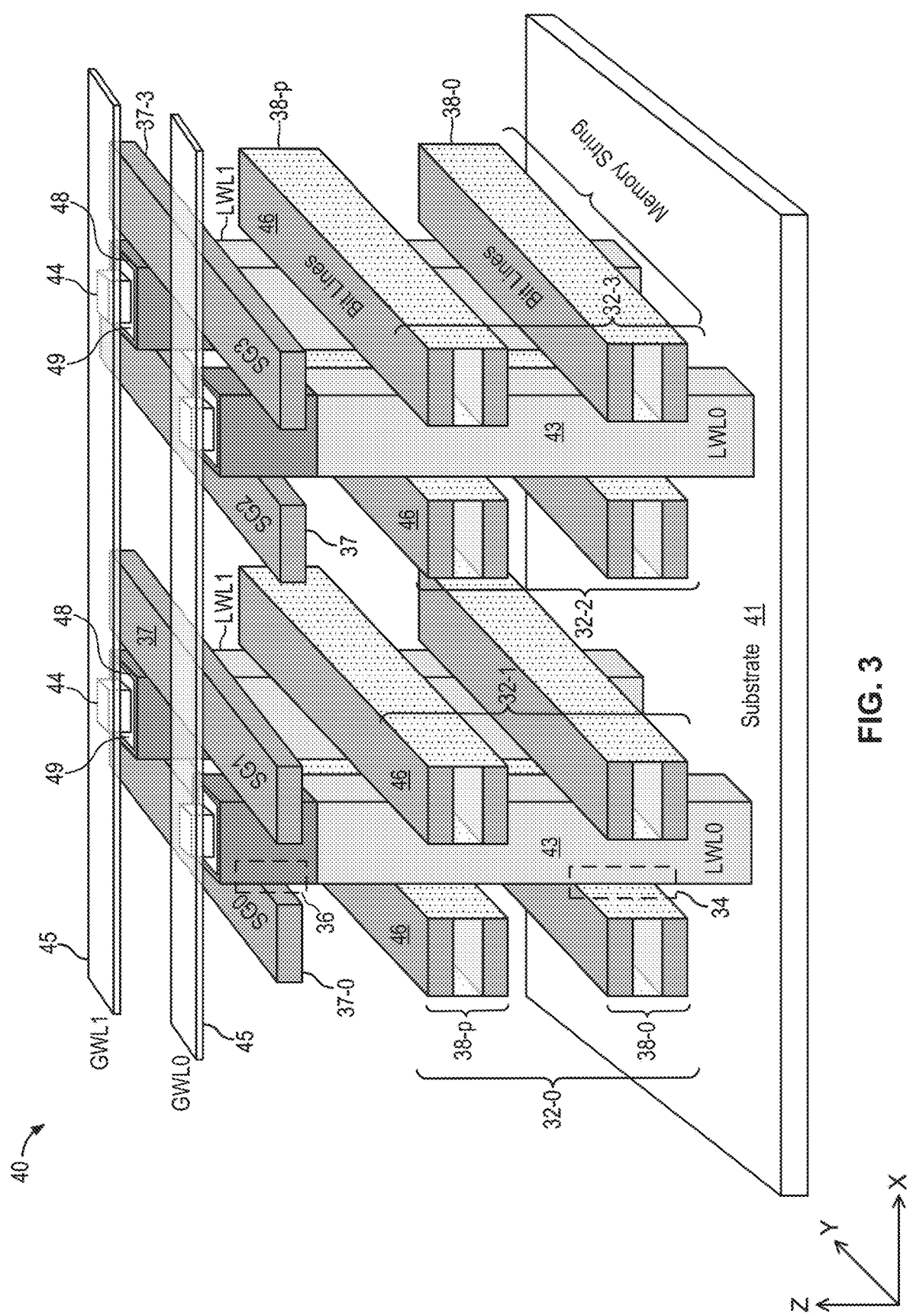
FIG. 3 is a perspective view of a three-dimensional memory device illustrating an implementation of a portion of the memory circuit of FIG. 2 in some embodiments.

FIG. 2 is a scheme diagram illustrating a memory circuit incorporating local word line select transistors that can be constructed using the memory structure of FIG. 1 in some embodiments. FIG. 3 is a perspective view of a three-dimensional memory device illustrating an implementation of a portion of the memory circuit of FIG. 2 in some embodiments. Like elements in FIGS. 2 and 3 are given like reference numerals. Referring first to FIGS. 2, a memory circuit 30 includes an array of active stacks 32 (active stacks 32-0 to 32-$n$) forming an array of NOR memory strings 38 across the multiple active stacks. In each active stack 32, NOR memory strings 38 of ferroelectric memory transistor 34 are formed in multiple layers (layers 0 to p)—that is, NOR memory strings 38-0 to 38-$p$ are formed one on top of another in each active stack. Each NOR memory string 38 includes m+1 number of ferroelectric memory transistors 34 connected in parallel between a bit line BLx,y and a source line SLx,y. The ferroelectric memory transistors 34 have their gate terminals connected to respective local word lines LWL0 to LWLm.

More specifically, in each active stack 32, memory transistors 34 in the NOR memory strings 38 that are vertically aligned in the multiple layers 0 to p have their gate terminals connected to the same local word line LWLx (i.e. one of LWL0 to LWLm). The local word lines LWLx across the array of active stacks 32 are to be connected to the same global word line GWLx (i.e. one of GWL0 to GWLm). In memory circuit 30, the n+1 number of NOR memory strings 38 in each layer are organized in k number of memory pages so that each memory page has (n+1)/k memory transistors or (n+1)/k bits. Each memory access operation is carried out in units of a memory page so that each memory access operation is performed on selected memory transistors associated with a given memory page.

FIG. 3 illustrates an exemplary memory device 40 which can be used to implement a portion of the memory circuit 30 (FIG. 2). Referring to FIG. 3, the memory device 40 includes memory transistors formed on a substrate 41. Substrate 41 may include logic circuitry for operating the memory transistors, referred to as circuits under array, as described above. In the illustration shown in FIG. 3, the memory device 40 includes active stacks 32-0 and 32-1 formed adjacent a first set of local word line structures 43. The memory device 40 further includes active stacks 32-2 and 32-3 formed adjacent a second set of local word line structures 43. Each active stack 32 includes an array of NOR memory strings 38 formed one on top of another in p+1 layers, that is, memory strings 38-0 to 38-$p$. A conductive layer 46 in each NOR memory string forms the common drain layer or the bit line of the memory string. Each local word line structure 43 includes a local word line LWLx being the gate conductor layer of the memory transistors that are vertically aligned in the memory strings 38 formed in the p+1 layers. In FIG. 3, local word line LWL0 and LWL1 are shown. Global word lines are formed above the memory stacks extending in a direction traverse to the memory strings. The local word lines LWLx that are aligned in the Y-direction are to be connected to the same respective global word lines GWLx. For example, the local word lines LWL0 in the first and second sets of local word line structures are to be connected to the global word line GWL0 and the local word line LWL1 in the first and second sets of local word line structures are to be connected to the global word line GWL1.

Referring to FIG. 2, in operation, a given global word line GWLx is activated to select a section of memory transistors (also referred to as "a slice of memory transistors") that are connected to the local word line LWLx across the p+1 number of memory strings 38 in the multiple layers and across the n+1 number of active stacks. For example, the global word line GWL1 is activated to select a slice of memory transistors 34 that are connected to local word line LWL1 across memory strings 38-0 to 38-$p$ and across memory stacks 32-0 to 32-$n$. In particular, the bit lines BLx,y associated with the selected memory page in the slice of memory transistors are activated to perform the memory operation.

In embodiments of the present invention, the memory circuit 30 includes word line select transistors 36 provided at each local word line LWLx to connect the respective local word line to the respective global word line GWLx. For example, a word line select transistor 36-0,$m$ connects a local word line LWLm in an active stack 32-0 to the global word line GWLm. In another example, a word line select transistor 36-$n$,0 connects a local word line LWL0 in an active stack 32-$n$ to the global word line GWL0. In this manner, each global word line GWLx is selectively connected to the associated local word lines LWLx in a slice of memory transistors. In particular, the word line select transistors 36 are controlled by respective select gate signals SGx (such as SG0 to SGn) to selectively connect a subset of local word lines in a slice of memory transistors to the associated global word line. That is, a subset of word line select transistors 36 are selected by the respective select gate signals SGx to turn on and connect local word lines LWLx associated with the selected memory page to the activated global word line GWLx. Other unselected word line select transistors 36 remain turned off and their respective local word lines are disconnected to the associated global word line. Accordingly, the parasitic capacitance experienced by each activated global word line is significantly reduced, which reduces the latency of the memory circuit.

In other words, in the case the memory circuit is implemented without the word line select transistors, each time a global word line is activated, the global word line has to drive all of the local word lines connected thereto (i.e. LWL0 to LWLn), of which only a portion is associated with the selected memory page. The local word lines associated with the unselected memory page contribute to the parasitic capacitance as seen by the global word line. Furthermore, activating the local word lines of the unselected memory page may lead to disturb of the stored data value of unselected memory transistors. According to embodiments of the present invention, the memory circuit 30 includes word line select transistors to selectively connect the global word lines to respective local word lines. Accordingly, at each memory access operation, only local word lines of the selected memory page are connected to the activated global word line. The local word lines associated with the unselected memory page are not connected to the global word line and do not contribute to the parasitic capacitance as seen by the global word line. Furthermore, disturb of unselected memory transistors is avoided by not activating the gate terminals of the unselected memory transistors. In this scheme, only the unselected memory transistor of unselected memory pages associated with the activated local word line may experience disturb but these instances will be limited.

In one example, the memory circuit has 2048 memory stacks or bit lines (n+1=2048) and 16 layers or memory strings in each memory stack (p+1=16). The bit lines are divided into 4 memory pages in each (k=4), each page having 512 bit lines. Each NOR memory string has 4096 memory transistors and thus 4096 global word lines (m+1=4096). In the present embodiment, the memory device is configured with one local word line structure shared by two adjacent memory stacks. Accordingly, each global word line is selectively connected to 1024 local word lines. At each global word line activation, one out of 4 memory pages is selected and the word line select transistors connects the local word lines of the selected memory page to the activated global word line. In this manner, at each memory access operation, an activated global word line is only connected to 512 local word lines to access 512 memory transistors. The other 512 local word lines are not connected to the activated global word line. In this configuration, the parasitic capacitance as seen by the global word line is reduced by half.

In embodiments of the present invention, the word line select transistors 36 are vertical thin-film transistors. In the present embodiment, the word line select transistors 36 are used to transfer word line voltages and do not need to have a large drive capability as the ferroelectric memory transistors can be operated at low voltage values. For example, the word line voltage may be 3V for ferroelectric memory transistors. In that case, the word line select transistors only need to be 4V transistors to transfer the 3V word line voltage. In another example, the word line voltage may be 2V while the bit line is biased to −1V. In that case, the word line select transistors only need to be 3V transistors to transfer the 3V word line voltage.

Referring still to FIGS. 2 and 3, in some embodiments, each word line select transistor 36 has a source terminal connected to a respective local word line LWLx (i.e., the gate conductor layer in the respective local word line structure) and a drain terminal connected to a respective global word line GWLx. For example, in the exemplary embodiment shown in FIG. 3, the drain terminal of each word line select transistor may include a via 44 to connect to the conductive line 45 forming the respective global word line (FIG. 3). Each word line select transistor 36 includes a gate terminal formed by a gate conductor layer 37. In the present embodiment, the gate conductor layer 37 extends in the same direction as the common drain layers (or bit lines) 46 of the NOR memory strings 38. In some embodiments, the gate conductor layer 37 is formed in the same manner as the conductor layer forming the common drain layer. In the present embodiment, the gate dielectric layer 48 and the channel layer 49 of the word line select transistor 36 are formed above the respective columnar local word line structure. A word line select transistor 36 is formed at the intersection of the gate conductor layer 37 and the gate dielectric layer 48 with the channel layer 49.

Figure 4:
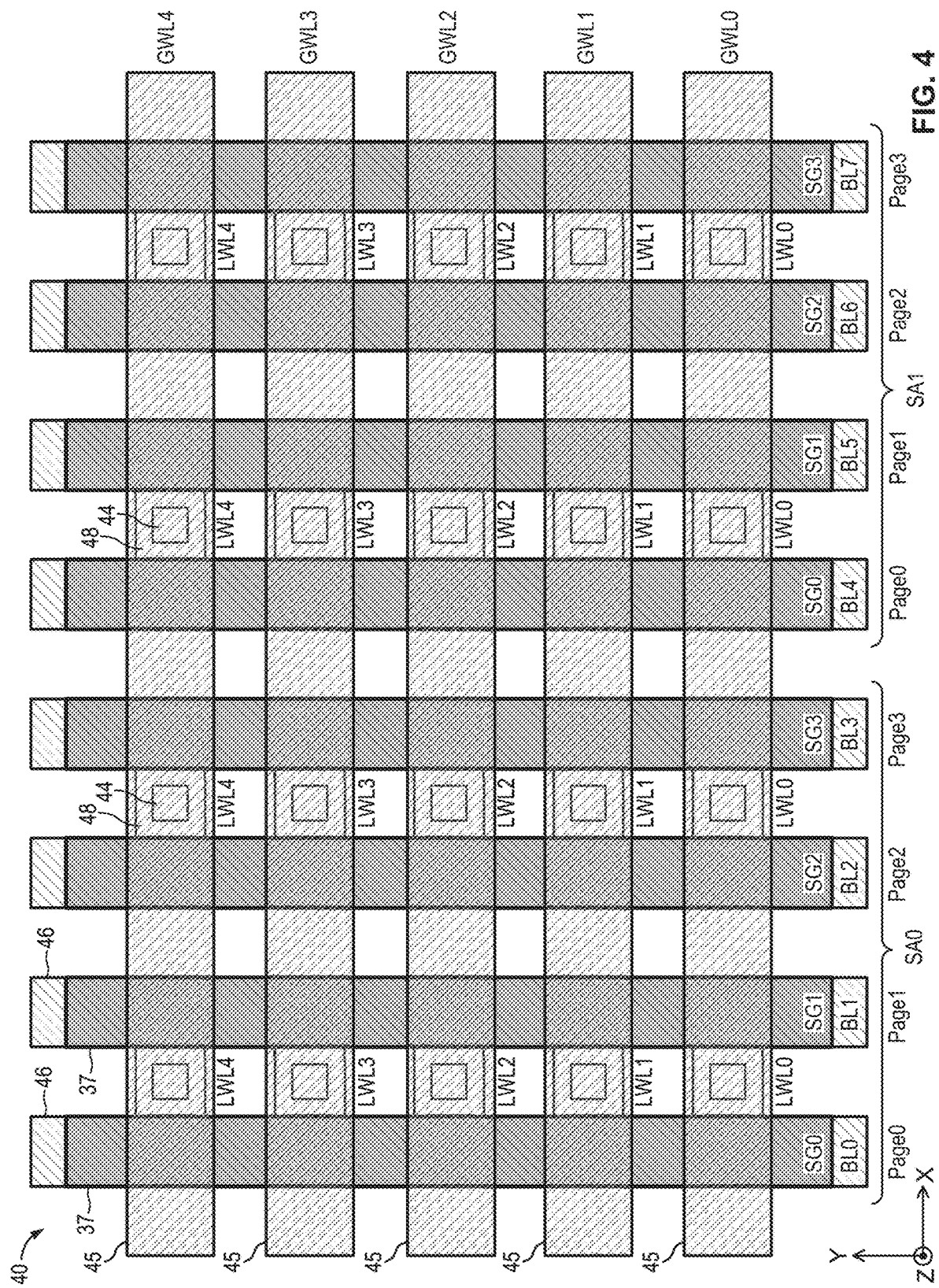
FIG. 4 is a top view illustrating a portion of the three-dimensional memory device of FIG. 3 in some embodiments. Like elements in FIGS. 3 and 4 are given like reference numerals.

FIG. 4 is a top view illustrating a portion of the three-dimensional memory device of FIG. 3 in some embodiments. Like elements in FIGS. 3 and 4 are given like reference numerals. Referring to FIG. 4, the memory device 40 includes NOR memory strings formed as part of the memory stacks arranged spaced apart in the X-direction and extending in the Y-direction. In FIG. 4, bit lines 46 are shown to represent one of the NOR memory strings of the memory stacks. In particular, the topmost bit lines of the memory stacks are illustrated in FIG. 4.

In the present embodiment, local word line structures are formed in alternate trenches between adjacent pairs of memory stacks and spaced apart in the Y-direction in the respective trench. Memory transistors are formed at the intersection of each memory string in the memory stack and a local word line structure. In the present illustration, local word line structures for local word lines LWL0 to LWL4 are shown.

According to embodiments of the present invention, word line select transistors are formed above the memory stacks and on the columnar local word line structures. In the present embodiment, the gate conductor layer 37 of the word line select transistors is formed using the same conductor layer as the bit line or source line of the NOR memory string. Therefore, the gate conductor layer 37 overlaps the bit lines 46 of the memory stack, as shown in FIG. 4. The gate conductor layers 37 carry the respective select gate signals SG0 to SGn to control the respective word line select transistors, that is, to turn the word line select transistors on or off. Word line select transistors are provided to connect the local word lines to respective global word lines. Global word lines GWL are formed in a conductive layer 45, such as a metal layer. Global word lines GWL extend in the X-direction and traverse the bit lines and the gate conductive layers 37 of the word line select transistors. As thus configured, each global word line GWL connects to the same local word line in each trench in the Y-direction. That is, global word line GWL0 connects to local word lines LWL0 across the memory stacks and global word line GWL4 connects to local word lines LWL4 across the memory stacks.

In memory device 40, the n+1 bit lines in each layer are divided into k number of memory pages. In the present illustration, each layer of bit lines are divided into 4 memory pages. To that end, each memory access will activate bit lines associated with one memory page. In the example shown in FIG. 4, bit lines BL0 to BL3 are assigned to respective memory page Page0 to Page3. Bit lines BL0 to BL3 can be the first data bit in each of the memory pages and the bit lines are selectively connected to a first sense amplifier SA0. Similarly, bit lines BL4 to BL7 are assigned to respective memory page Page0 to Page3. Bit lines BL4 to BL7 can be the second data bit in each of the memory pages and the bit lines are selectively connected to a second sense amplifier SA1.

In the above described embodiments, the gate terminals of the word line select transistors are provided in individual gate conductor layers 37. A word line select transistor is formed at the intersection of a gate conductor layer 37 and the gate dielectric/channel layer structure. Accordingly, a select gate signal SGx activates the word line select transistors associated with only one memory stack. In alternate embodiments, a select gate signal SGx can be configured to activate the word line select transistors associated with a pair of adjacent memory stacks.

Figure 5:
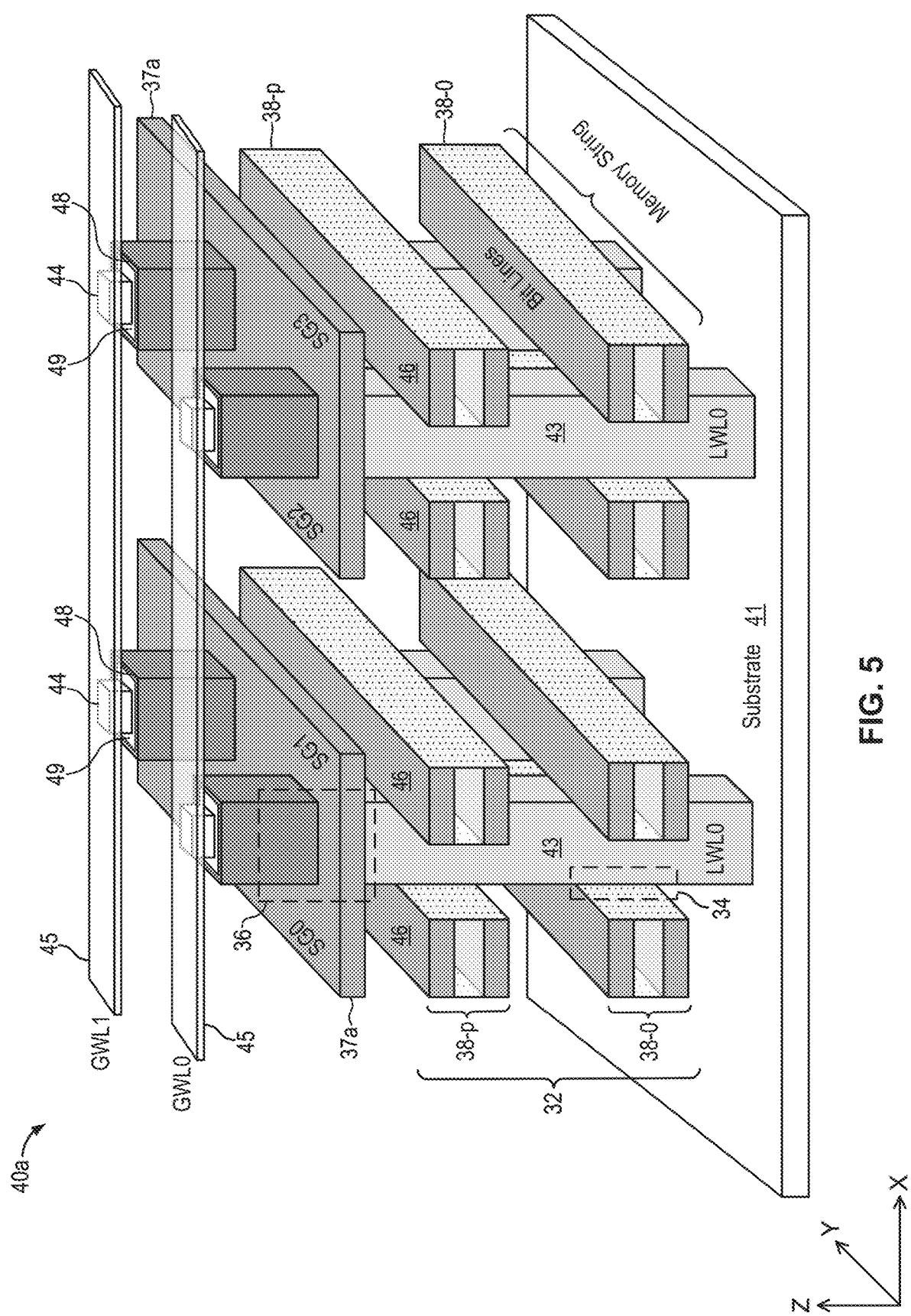
FIG. 5 is a perspective view of a three-dimensional memory device illustrating implementation of a portion of the memory circuit of FIG. 2 in alternate embodiments.

FIG. 5 is a perspective view of a three-dimensional memory device illustrating implementation of a portion of the memory circuit of FIG. 2 in alternate embodiments. Like elements in FIGS. 3 and 5 are given like reference numerals. Referring to FIG. 5, a memory device 40a includes word line select transistors 36 associated with a pair of adjacent memory stacks having a shared gate conductor layer 37a. That is, each gate conductor layer 37a controls the word line select transistors 36 formed on both side of the gate dielectric/channel layer structure. The configuration of the gate conductor layer 37a in FIG. 5 realizes certain fabrication simplicity without sacrificing the benefits of incorporating the word line select transistors. In particular, since adjacent memory stacks share the same local word line, the word line select transistors of the adjacent memory stacks can be controlled by the same select gate signal without altering the functionality of the memory operation. In practice, bit lines in adjacent memory stacks are typically assigned to different memory pages and are not selected in the same memory operation.

Figure 6:
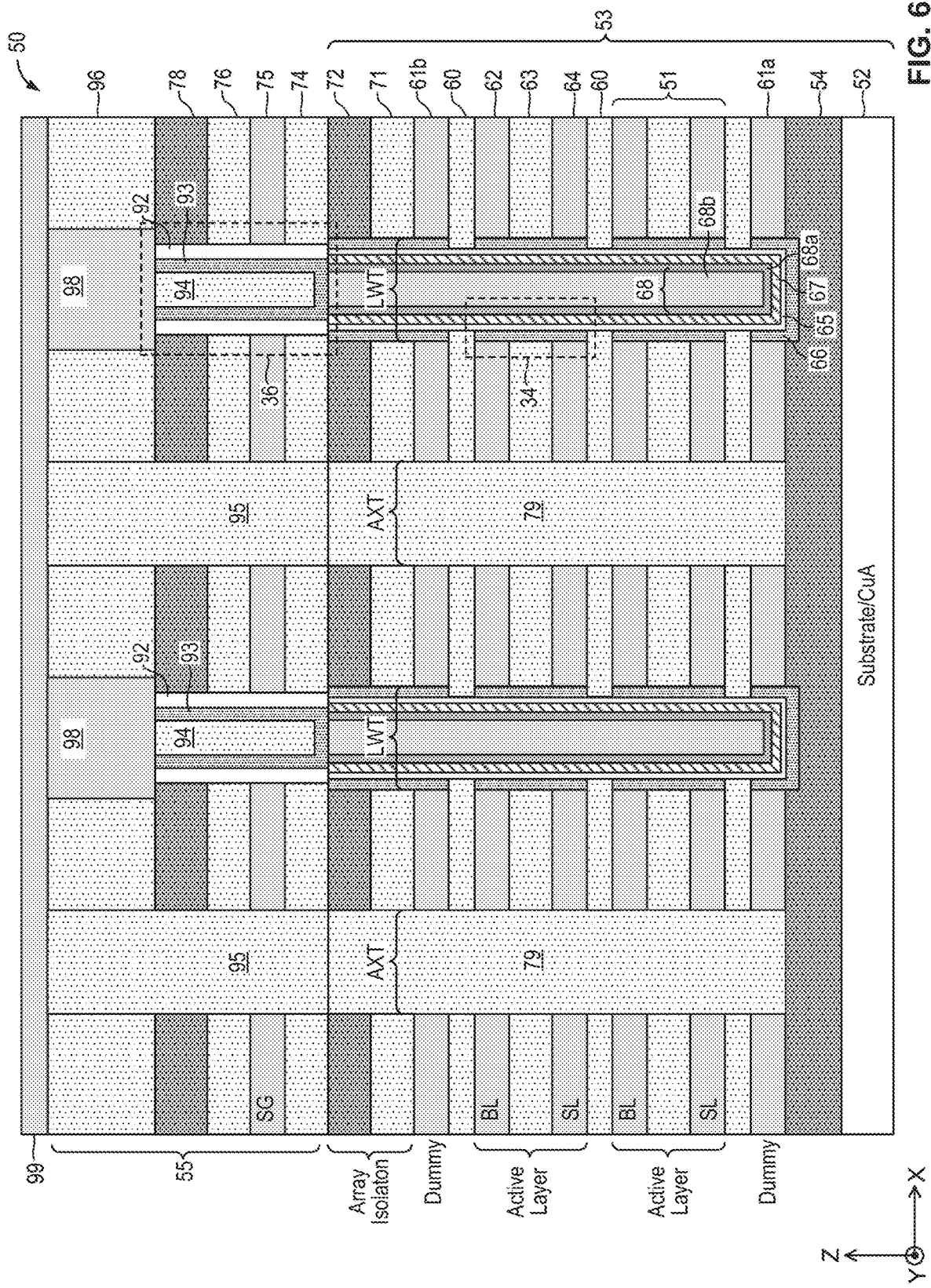
FIG. 6 is a cross-sectional diagram of a memory device of NOR memory strings incorporating word line select transistors in some embodiments.

FIG. 6 is a cross-sectional diagram of a memory device of NOR memory strings incorporating word line select transistors in some embodiments. Referring to FIG. 6, a memory structure 50 including word line select transistors formed above a three-dimensional memory array 53 in some embodiments. In embodiments of the present invention, the three-dimensional memory array 53 includes NOR memory strings formed in an array of memory stacks. In some embodiments, the memory array 53 is fabricated using a memory structure described in copending and commonly assigned U.S. patent application Ser. No. 17/936,320, entitled MEMORY STRUCTURE INCLUDING THREE-DIMENSIONAL NOR MEMORY STRINGS OF JUNCTIONLESS FERROELECTRIC MEMORY TRANSISTORS AND METHOD OF FABRICATION, filed Sep. 28, 2022, which application is incorporated herein by reference in its entirety. In another embodiment, the memory array 53 is fabricated using a memory structure described in copending and commonly assigned U.S. patent application Ser. No. 18/419,385, entitled FABRICATION METHOD FOR A THREE-DIMENSIONAL MEMORY ARRAY OF THIN-FILM FERROELECTRIC TRANSISTORS USING HIGH-ASPECT-RATIO LOCAL WORD LINE DAMASCENE PROCESS, filed Jan. 22, 2024, which application is incorporated herein by reference in its entirety. In embodiments, the memory array 53 can be fabricated in various ways and the process for fabricating the memory array 53 is not critical to the practice of the present invention.

In the present exemplary embodiment, the memory array 53 includes an array of memory stacks formed on a semiconductor substrate 52, which may have circuits formed therein, referred above as circuits under array or CuA. An insulating layer 54 may be provided between the semiconductor substrate 52 and the memory array formed on the substrate. Insulating layer 54 may also serve as an etch stop layer for the fabrication process for forming the memory array. The memory array 53 includes active layers 51 and inter-layer isolation layer 60 formed alternately one on top of another. Each active layer 51 includes a first conductive layer 62 forming the common drain layer or bit line of the NOR memory string and a second conductive layer 64 forming the common source layer or source line of the NOR memory string. The first conductive layer 62 is separated from the second conductive layer 64 by a channel spacer dielectric layer 63. The memory array 53 may include one or more dummy layers formed as bottommost layers or topmost layers of the memory stacks. In the present illustration, the memory array 53 includes a conductive layer 61a as a bottommost dummy layer. The dummy layer 61a can also serve as an anchor layer for the memory stacks formed thereon. In the present illustration, the memory array 53 further includes a conductive layer 61b as a topmost dummy layer. One or more insulating layers are provided on the memory array as an array isolation layer. In the present example, the array isolation layer includes an oxide layer 71 and a silicon oxycarbide (SiOC) layer 72.

The memory array 53 further includes trenches separating the memory stacks. In particular, the memory array 53 includes local word line trenches LWT in which the local word line structures are formed and auxiliary trenches AXT in which no active structures are formed. The local word line structures are formed spaced apart in the Y-direction at regular intervals to form ferroelectric memory transistors at the intersection with the active layers 51. In the local word line trenches LWT, each local word line structure includes a channel layer 66, a ferroelectric gate dielectric layer 67 and a gate conductor layer 68. In some examples, the gate conductor layer 68 may include a conductive liner 68a (such as titanium nitride TiN) as an adhesion layer and a low resistivity conductor 68b. In some embodiments, an interfacial layer 65 may be provided between the channel layer 66 and the ferroelectric gate dielectric layer 67. The channel layer 66 is isolated to each active layer 51, such as by being separated in the Z-direction. Ferroelectric memory transistors 34 are formed at each intersection of an active layer 51 and a local word line structure.

In embodiments of the present invention, word line select transistors are formed above the memory array 53. After completion of the processing of the memory array 53, additional processing are performed to form vertical thin-film transistors to serve as word line select transistors for the local word lines formed in the local word line structures. In particular, the word line select transistors are formed above the array isolation layer (layers 71 and 72). In some embodiments, the word line select transistors are formed using a multi-layer structure 55 similar to the layers forming the memory array 53. In the present embodiment, the word line select transistors are formed in a multi-layer structure 55 including a conductive layer 75 sandwiched between insulating layer 74 and 76. The conductive layer 75 forms the gate conductor layer which services the gate terminals of the word line select transistors. In some embodiments, the conductive layer 75 is formed using the same materials as the common drain layer 62 and the common source layer 64. For example, the conductive layer 75 can be a tungsten layer with a titanium nitride liner. The insulating layers 74 and 76 can be any dielectric layers, such as silicon dioxide layers ($SiO_2$). The multi-layer structure 55 may further include a capping dielectric layer 78. For example, the capping dielectric layer 78 can be a silicon oxycarbide layer (SiOC).

Channel structures of the local word line select transistors are formed overlying and having the same periodicity as the local word line structures of the memory array 53. Each channel structure includes a gate dielectric layer 92 adjacent to the multi-layer structures 55 and a channel layer 93 adjacent the gate dielectric layer. Remaining volume of the channel structure is filled by a dielectric layer 94, such as a silicon oxide layer ($SiO_2$). The channel layer 93 of each word line select transistor is in electrical contact with the gate conductor layer 68 of the associated local word line structure. The gate conductor layer of the local word line structure associated with the respective channel structure serves as the source terminal of the word line select transistor. The multi-layer structure 55 includes a top insulation layer 96 formed above the capping dielectric layer 78 and conductive via structures 98 formed in the top insulation layer 96. The conductive via structures are provided for each channel structure of the local word line transistors. In some embodiments, the conductive via structures 98 can be filled with a conductive material, such as tungsten or copper. Each conductive via structure 98 is in electrical contact with the channel layer 93 of the respective word line select transistor to serve as the drain terminal of the word line select transistor. In the present description, the gate conductor layer of the local word line structure is referred to as the source terminal of the word line select transistor and the conductive via structure 98 is referred to as the drain terminal of the word line select transistor. It is understood that the source and drain terminals of a field effect transistor are interchangeable and references to source and drain terminals as used herein are illustrative only. As thus configured, the gate conductor layer 75 wraps around the channel structure, wholly or partially, and a word line select transistor 36 is formed at the intersection of the gate conductor layer 75 and the channel structure.

A conductive layer 99, such as a metal layer, is formed above the multi-layer structure 55 and in electrical contact with the conductive via structures 98. The conductive layer 99 traverses the X-direction of the memory structure and functions as the global word lines of the memory structure. In some embodiments, the conductive layer 99 is a copper layer with or without a conductive liner layer. As thus configured, each global word line 99 contacts a set of conductive via structures 98 that are aligned in the Y-direction. In a row of local word line structures at a given Y-direction, the word line select transistors 36 are selectively activated to connect the global word line 99 to the gate conductor layer 68 of the local word line structure.

In some embodiments, the gate dielectric layer 92 of the word line select transistors is formed by a non-memory type dielectric. In some examples, the gate dielectric layer 92 is hafnium oxide (HfO), aluminum oxide ($Al_2O_3$), or silicon dioxide (SiO$_2$). In another example, a low temperate dielectric layer is used. In other examples, the gate dielectric layer 92 is a dielectric material having a dielectric constant of 3.9 or lower. In some embodiments, the channel layer 93 of the word line select transistors is formed of the same material as the channel layer of the ferroelectric memory transistors. In some examples, the channel layer 93 is formed using an amorphous oxide semiconductor material, such as indium gallium zinc oxide (InGaZnO or IGZO), indium zinc oxide (IZO), indium tungsten oxide (IWO), or indium tin oxide (ITO), or other such oxide semiconductor materials. A salient feature of the memory device of the present invention is that the memory transistors and the word line select transistors are both thin-film junctionless transistors. The oxide semiconductor channel layer enables source, drain conductive layers to connect directly to the channel of the transistor. In this manner, the word line select transistors can be built into the memory array and formed as an additional multi-layer structure.

In embodiments of the present invention, the gate conductor layer 75 can be formed wrapped around the channel structure to form the word line select transistors of FIG. 5. In other embodiments, the gate conductor layer 75 can be separated and in contact with only a portion of the channel structure, as shown in FIG. 3. The exact configuration of the gate conductor layer 75 is not critical to the practice of the present invention as the local word line of the associated local word line structure functions as the gate terminal to a pair of memory transistors in each layer formed by two adjacent active layers. In each global word line activation, a set of word line select transistors are selected to connect the global word line signal to the selected local word line and the bit lines (common drain layer) of the selected memory page are selected to perform the memory operation.

In some embodiments, the word line select transistors are formed during the part of the fabrication process of the memory device where precharge transistors are formed. In other embodiments, the word line select transistors can be formed in other parts of the memory device fabrication process. Exemplary fabrication process for forming the word line select transistors will be described below.

Figure 7A:
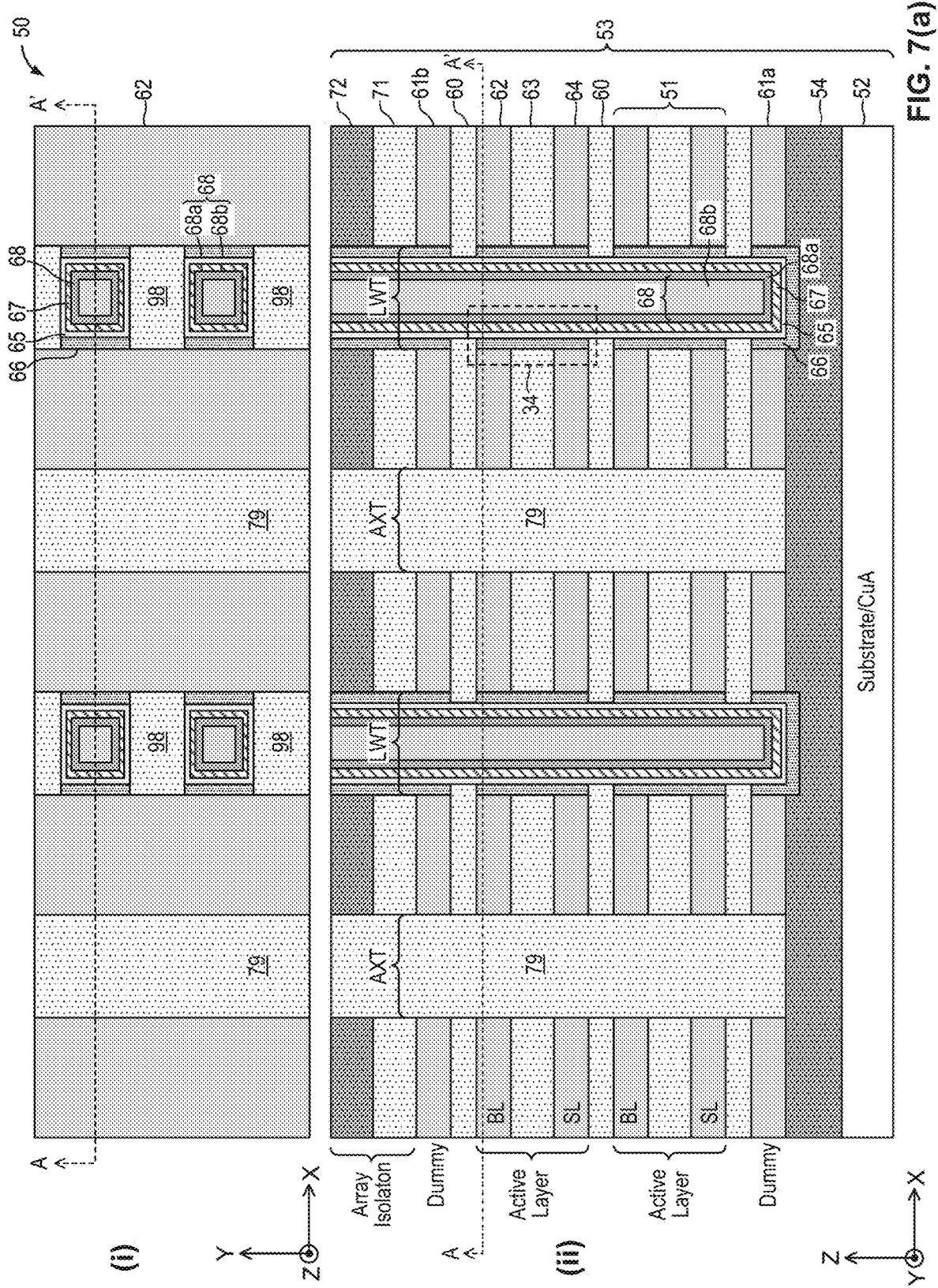
FIGS. 7(a) to 7(o), including FIGS. 7(c1), 7(c2), 7(k1), and 7(k2), illustrate the fabrication process of a memory structure including word line select transistors formed integrated with a three-dimensional memory array of memory transistors in some embodiments.
Figure 7B:
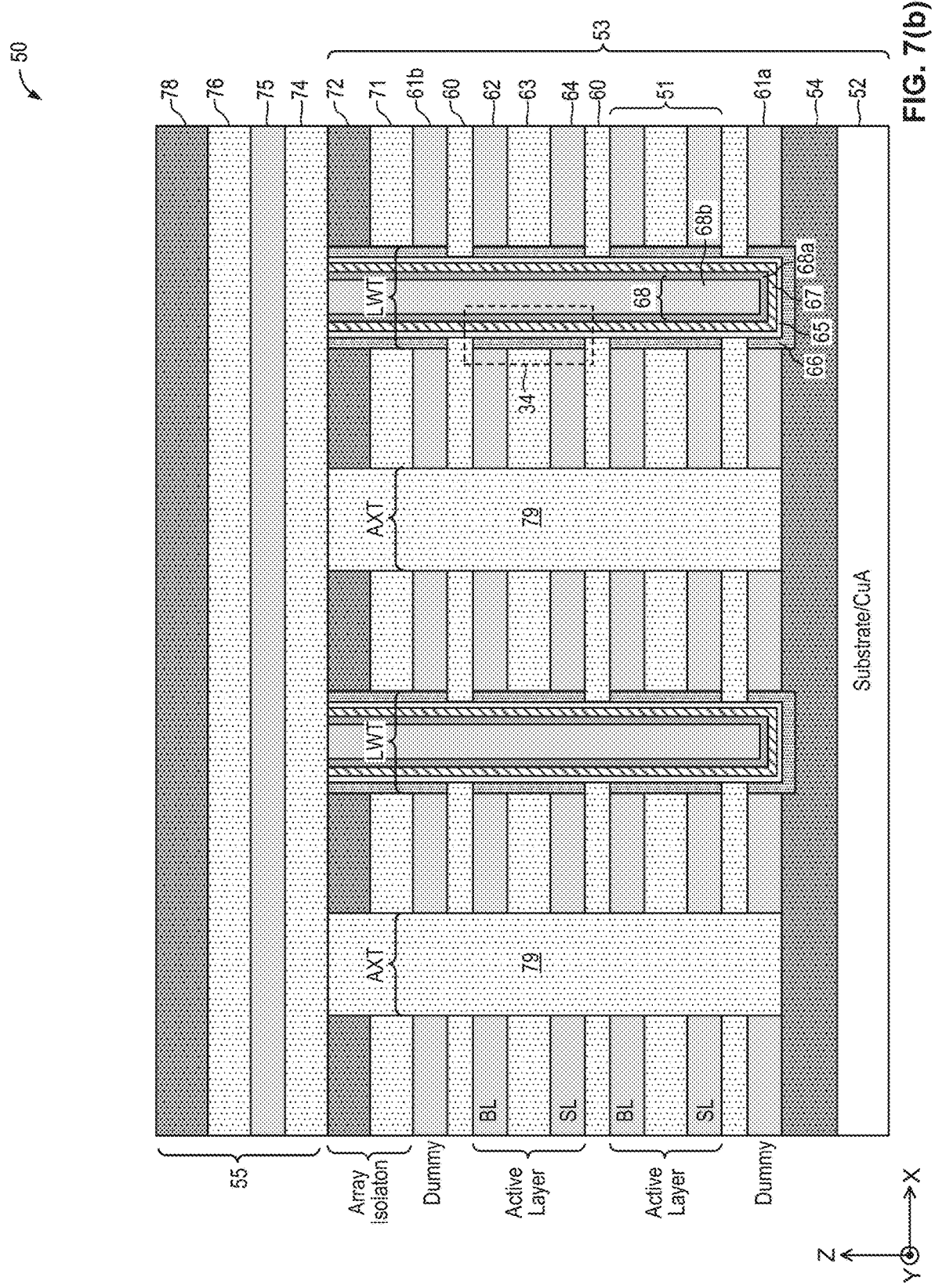
Figure 7C:
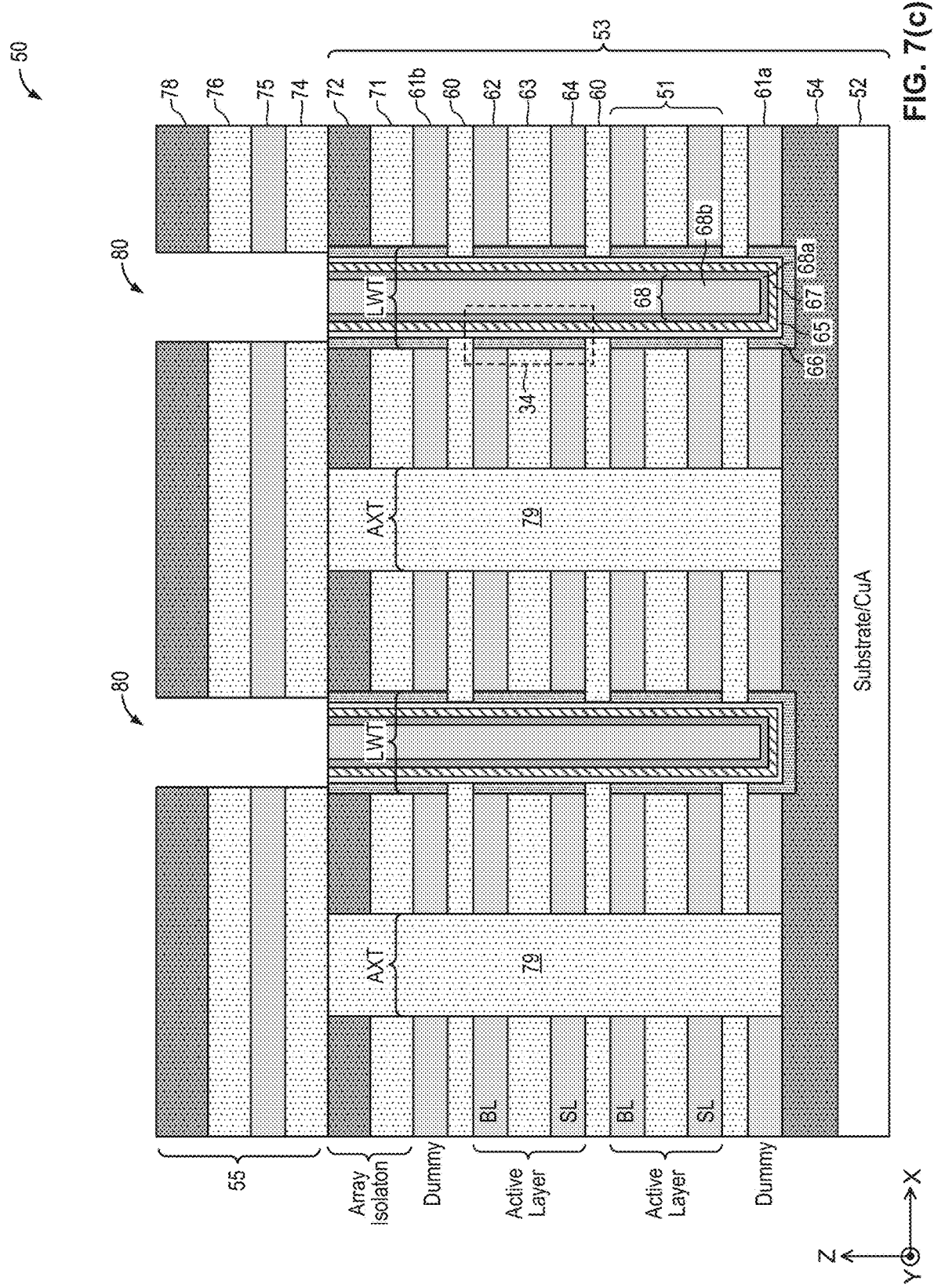
Figure 7:
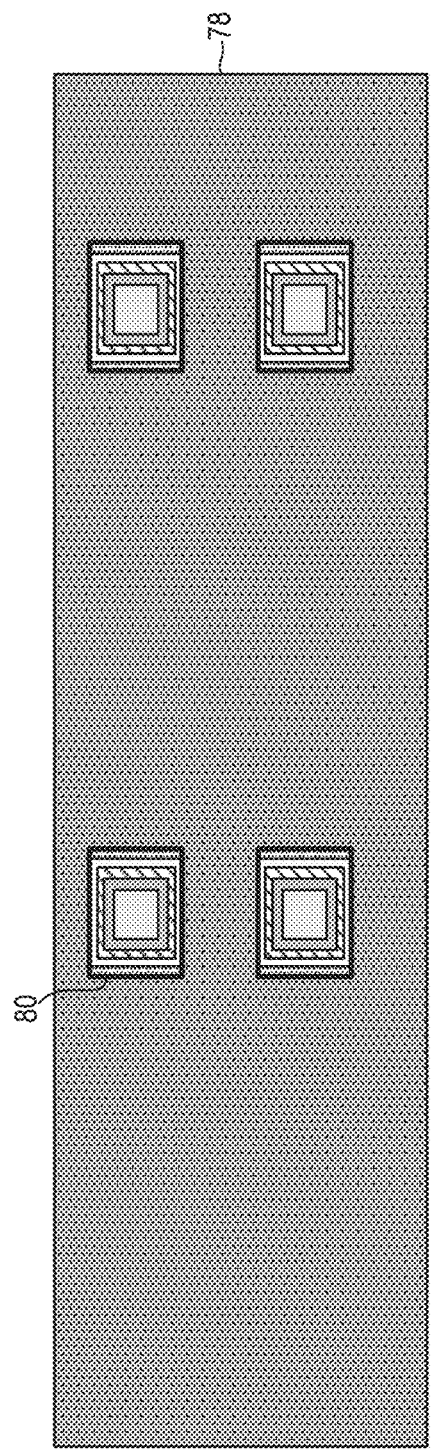
Figure 7:
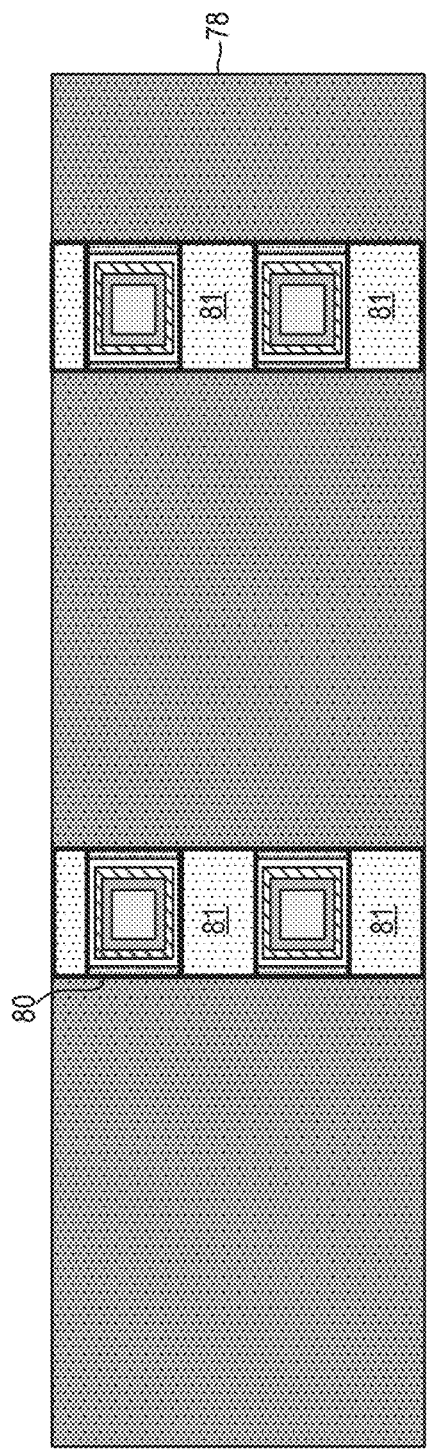
Figure 7D:
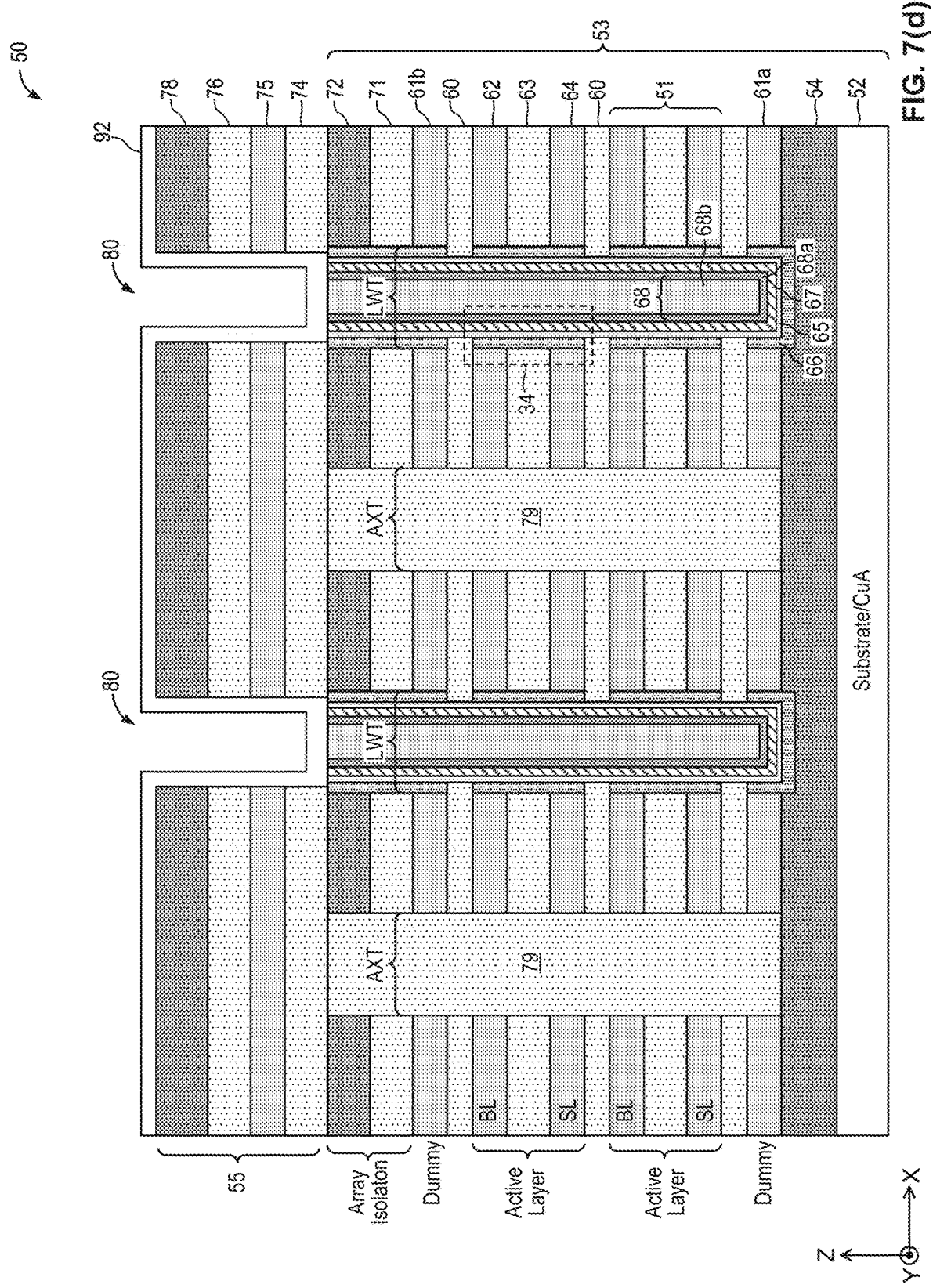
Figure 7E:
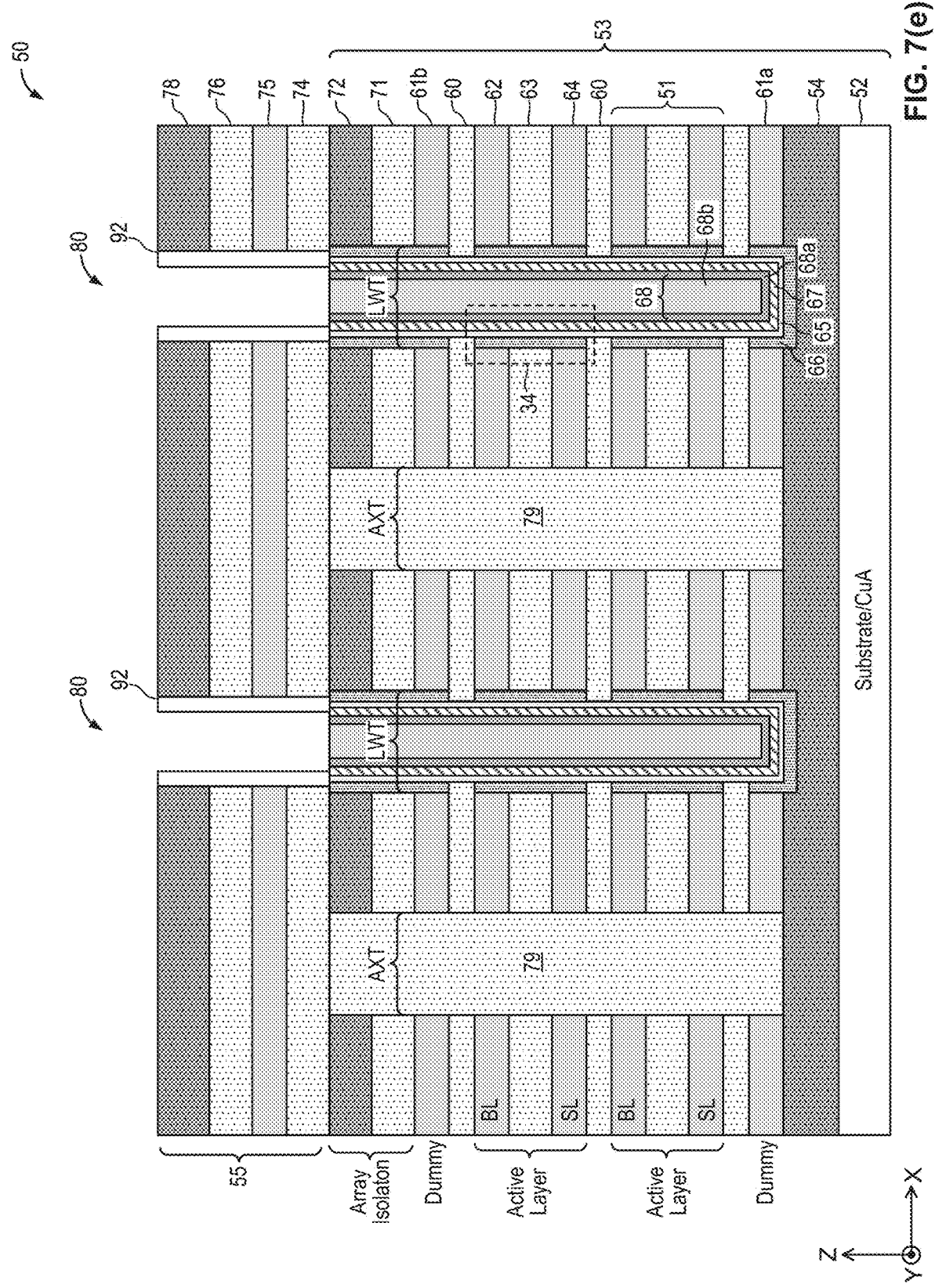
Figure 7F:
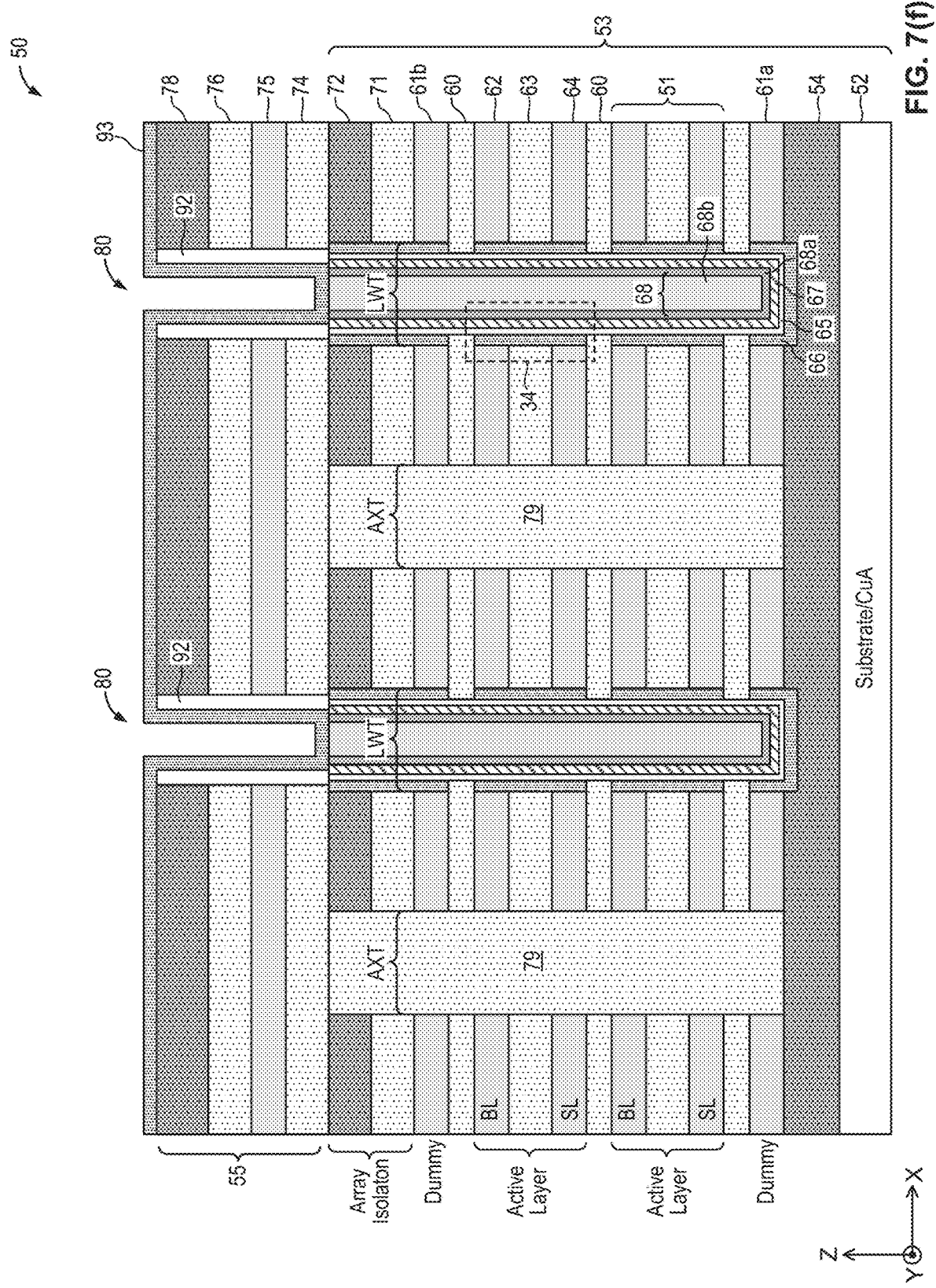
Figure 7G:
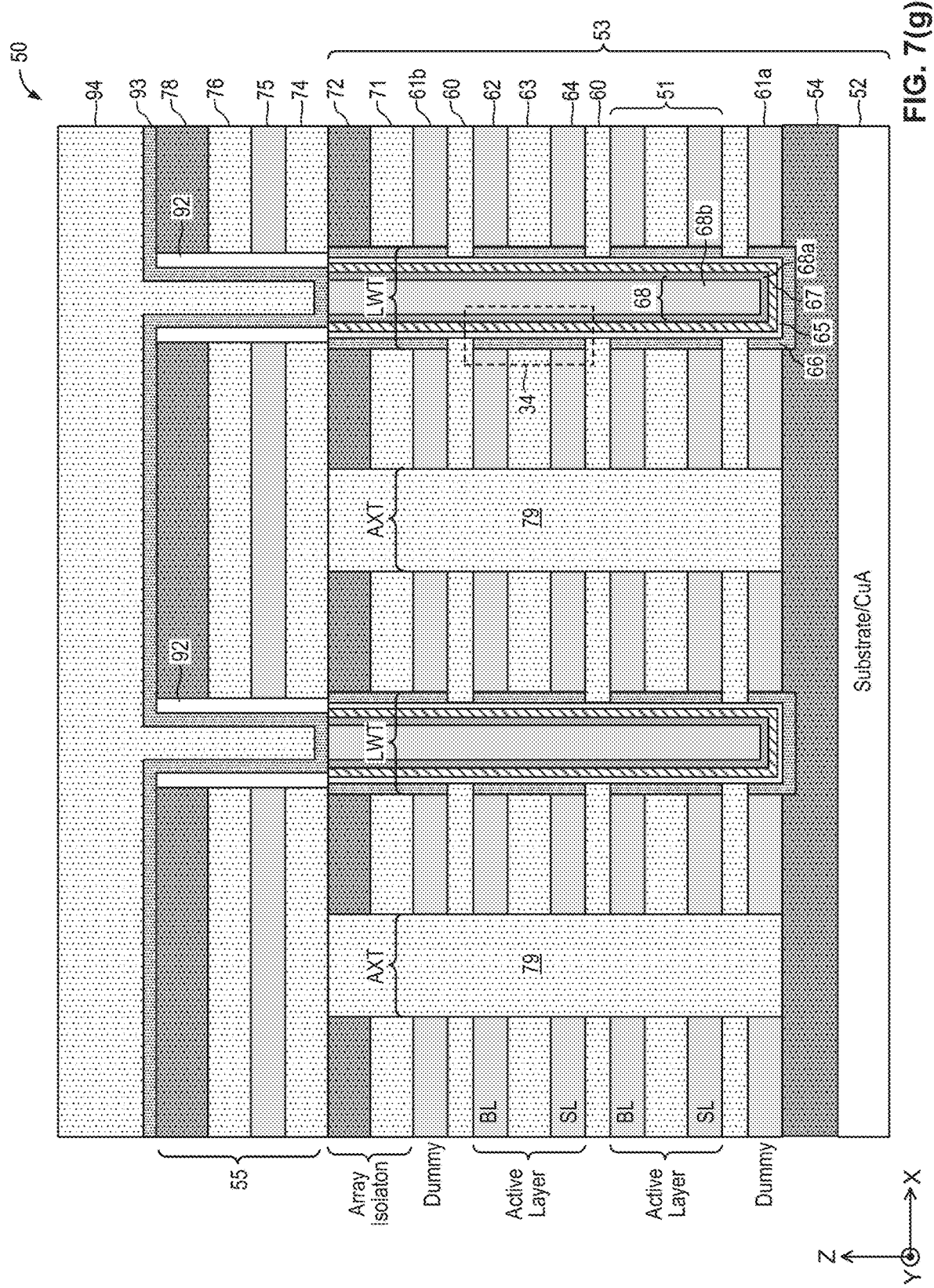
Figure 7H:
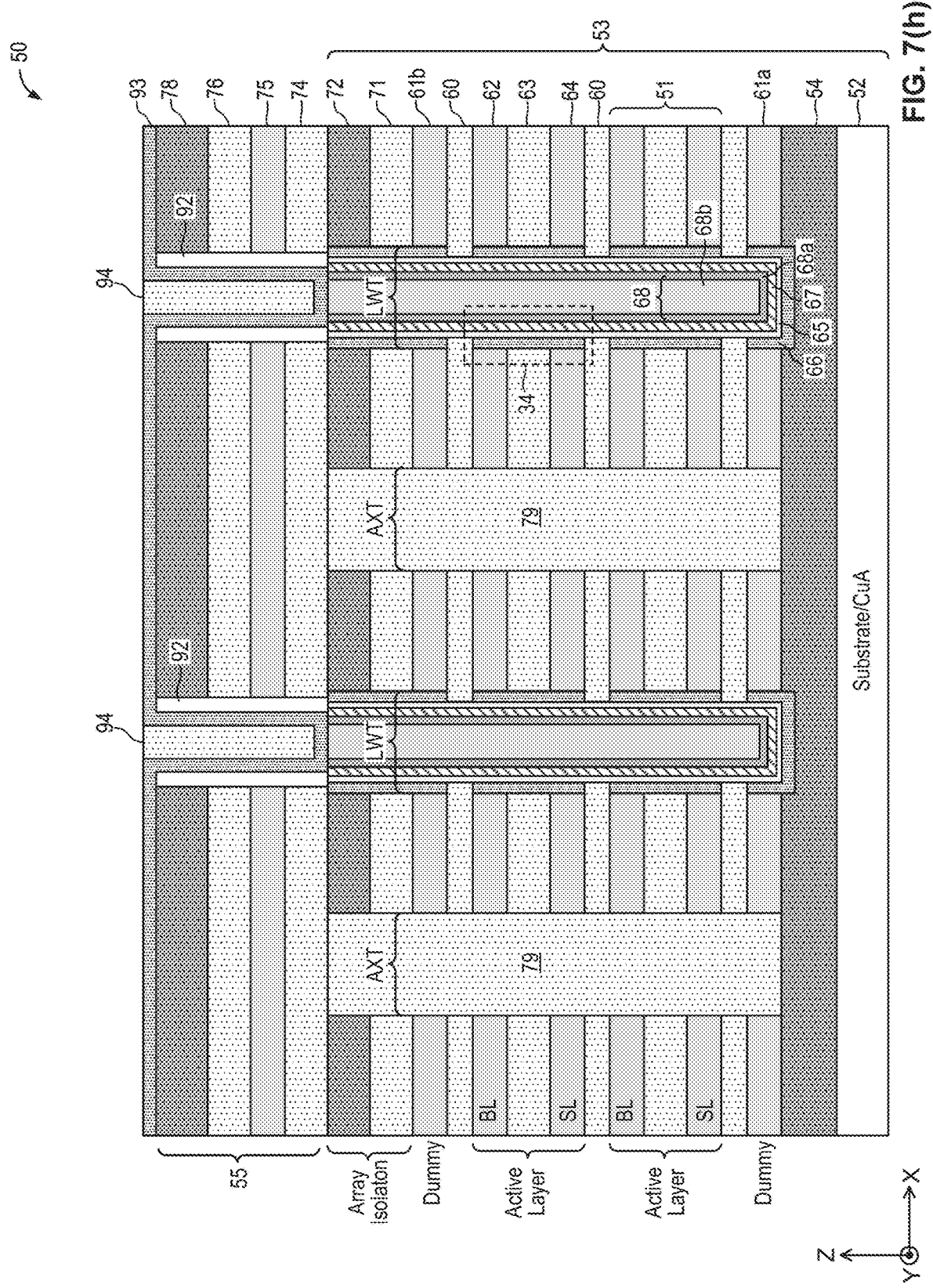
Figure 7I:
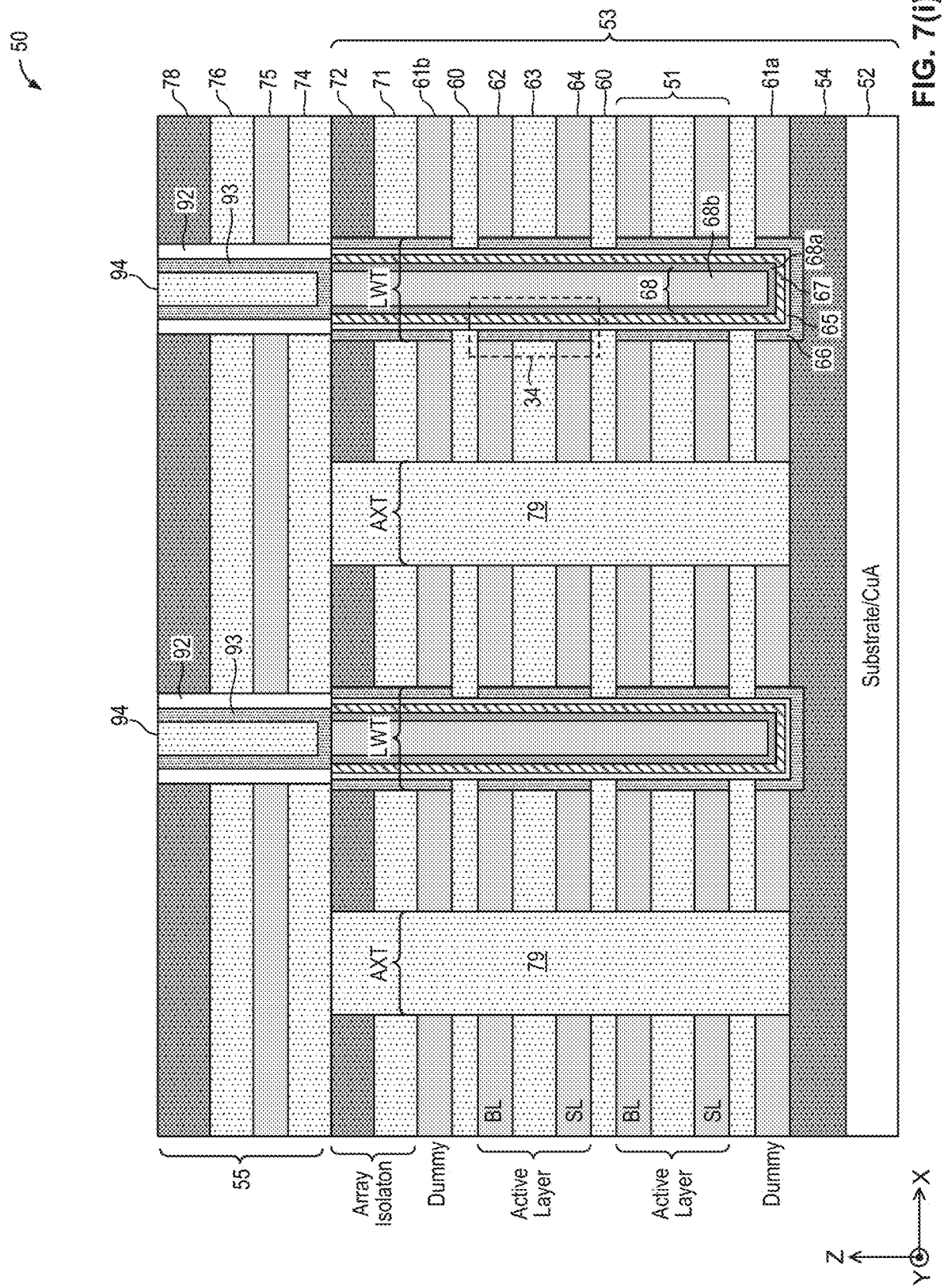
Figure 7J:
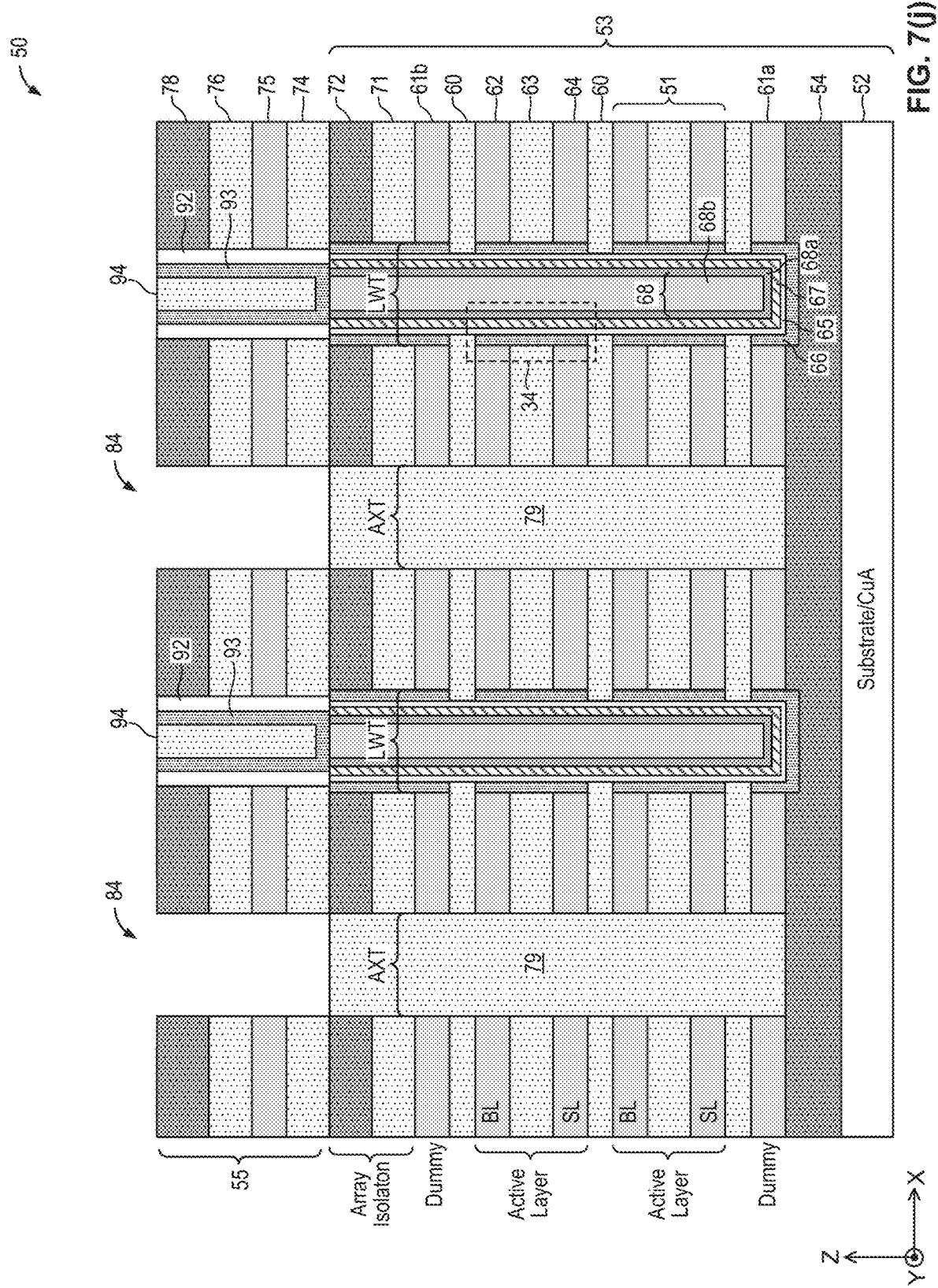
Figure 7K:
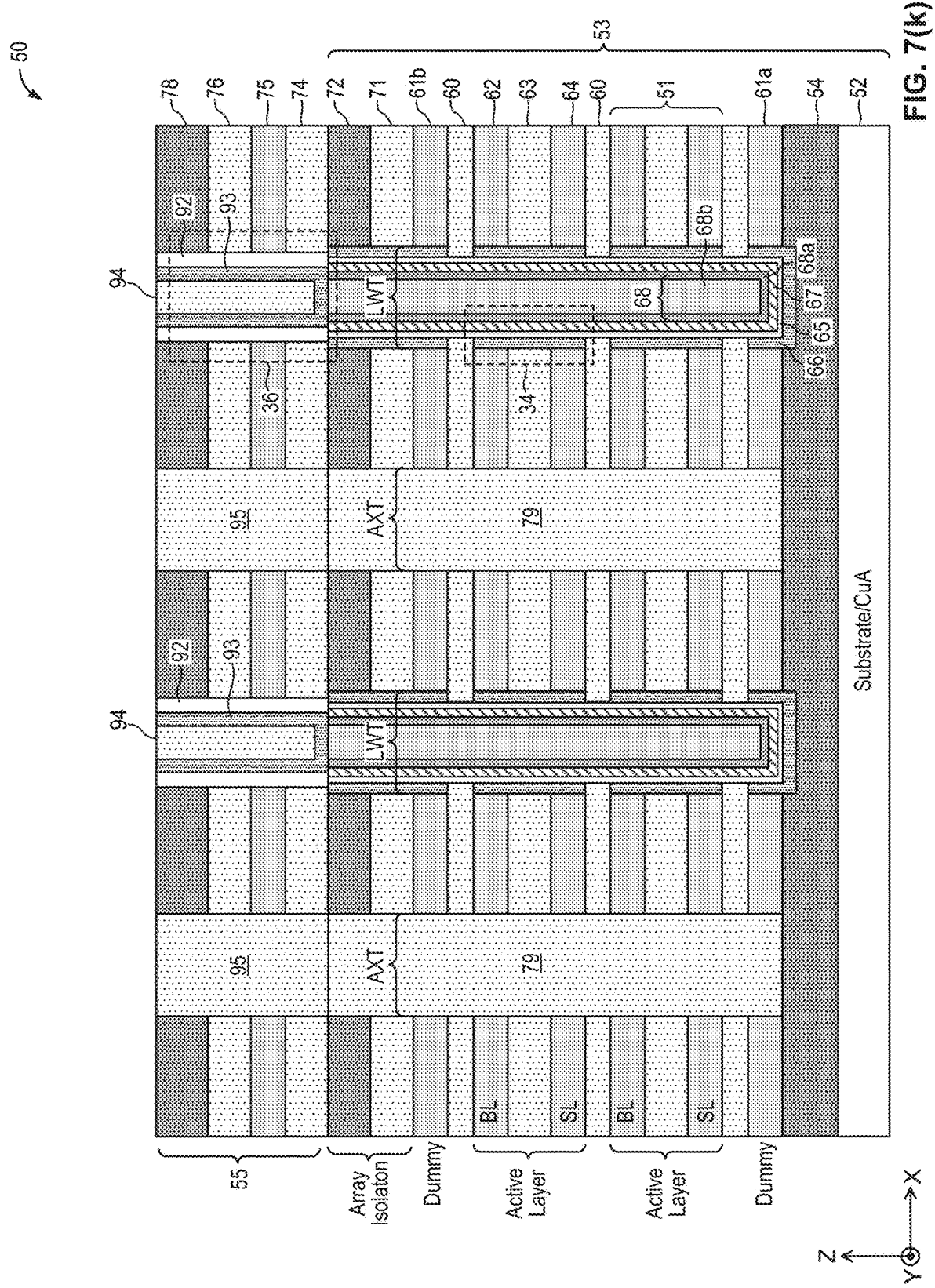
Figure 7I:
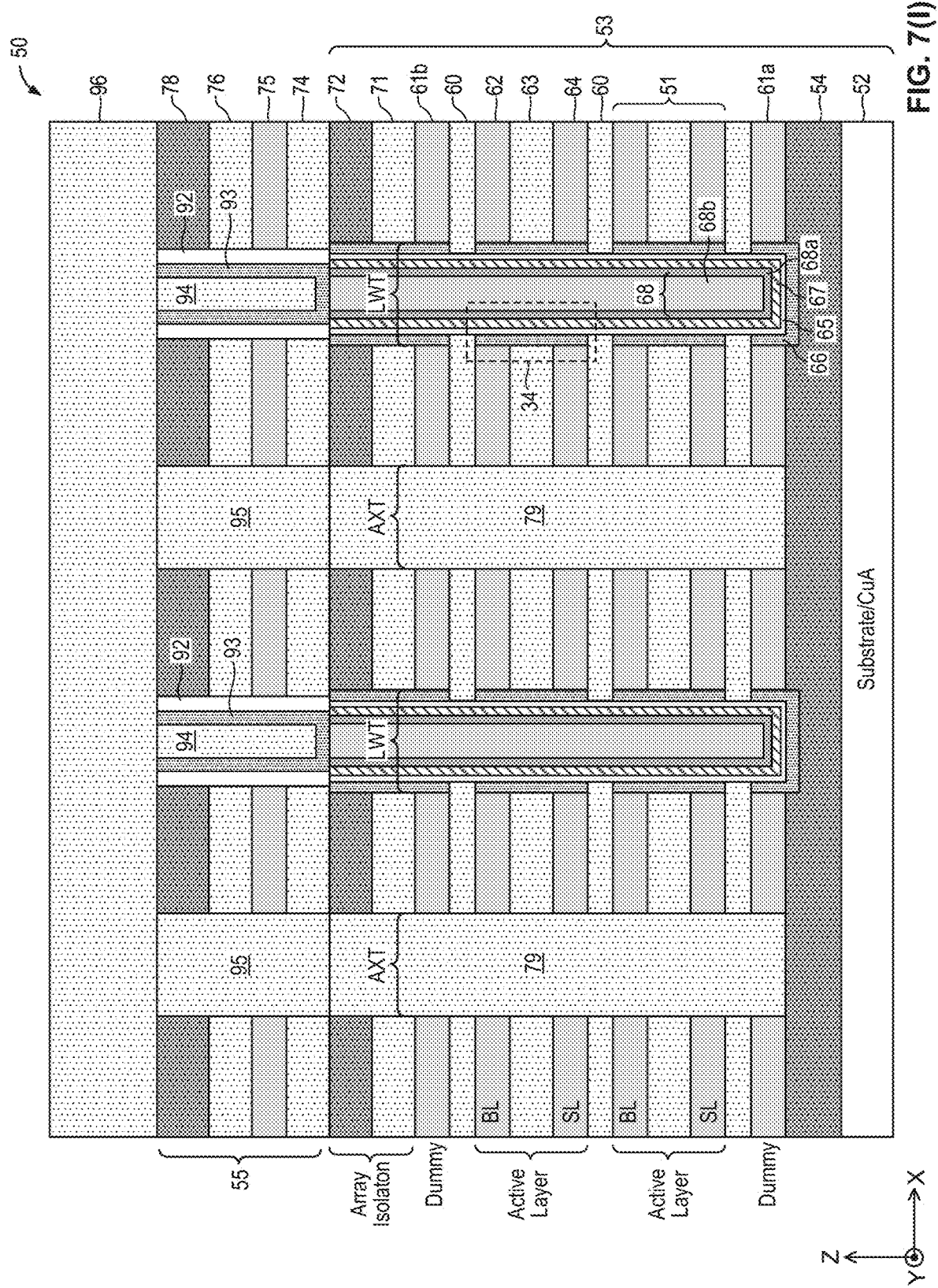
Figure 7M:
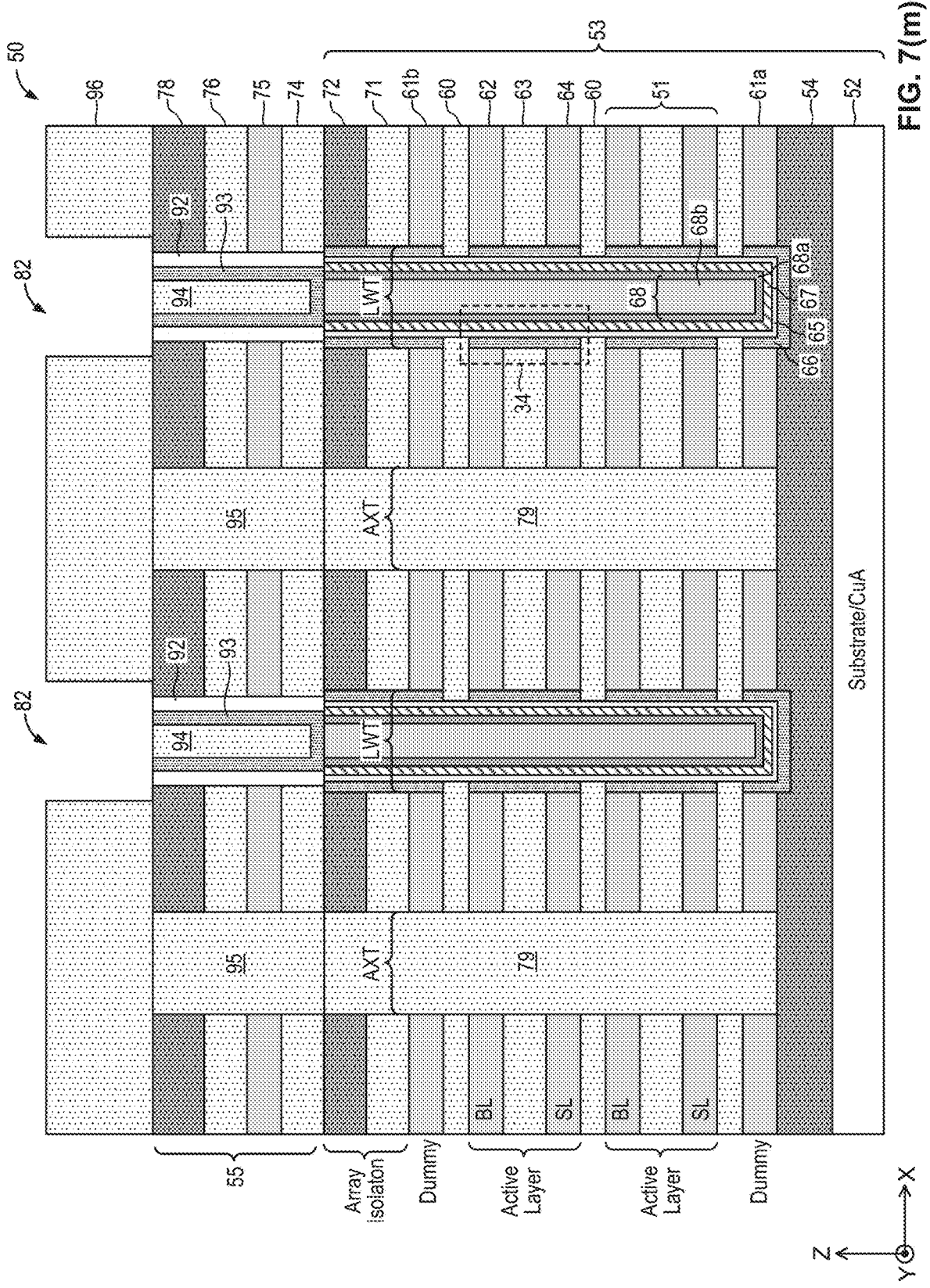
Figure 7N:
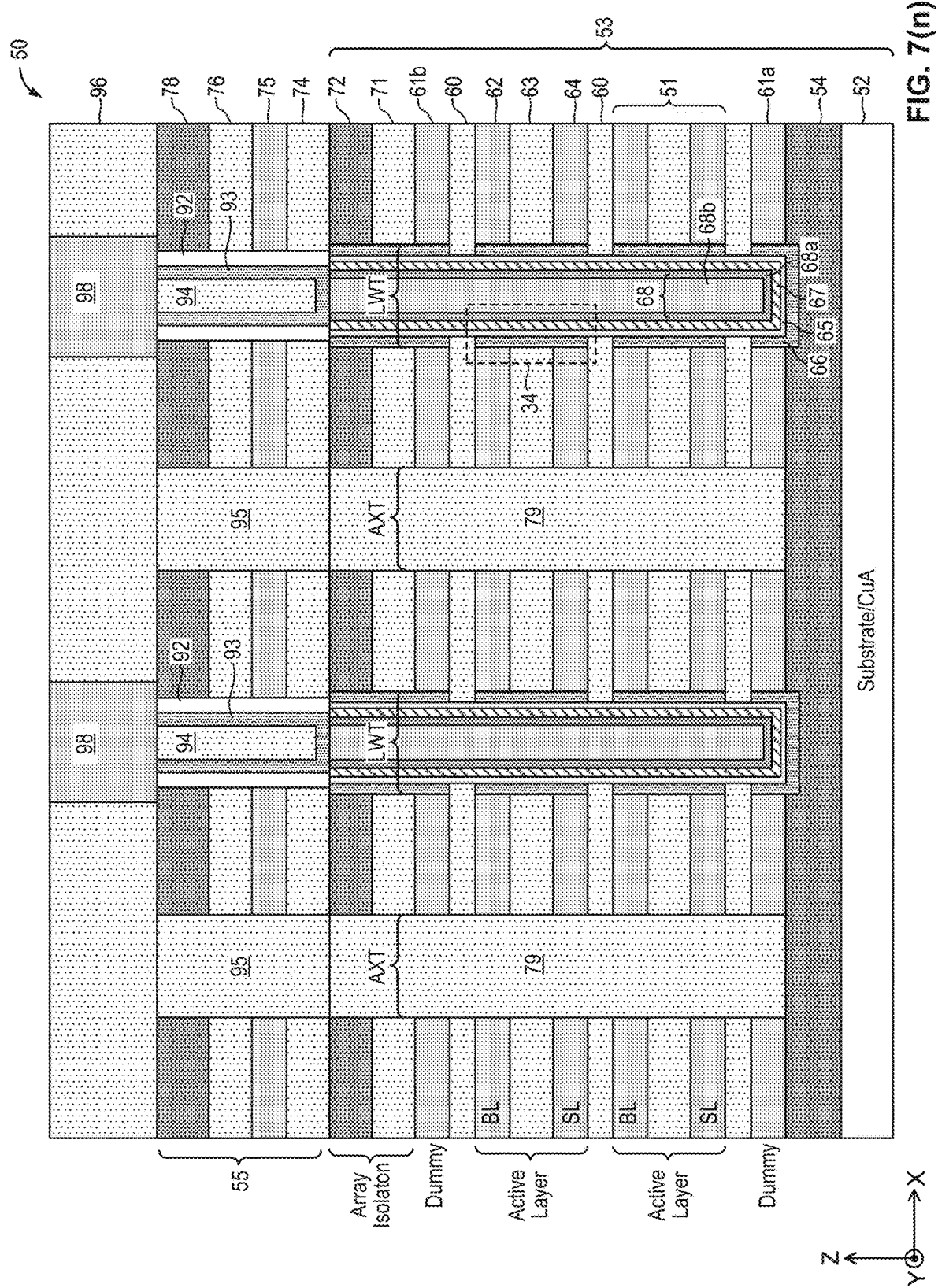
Figure 7O:
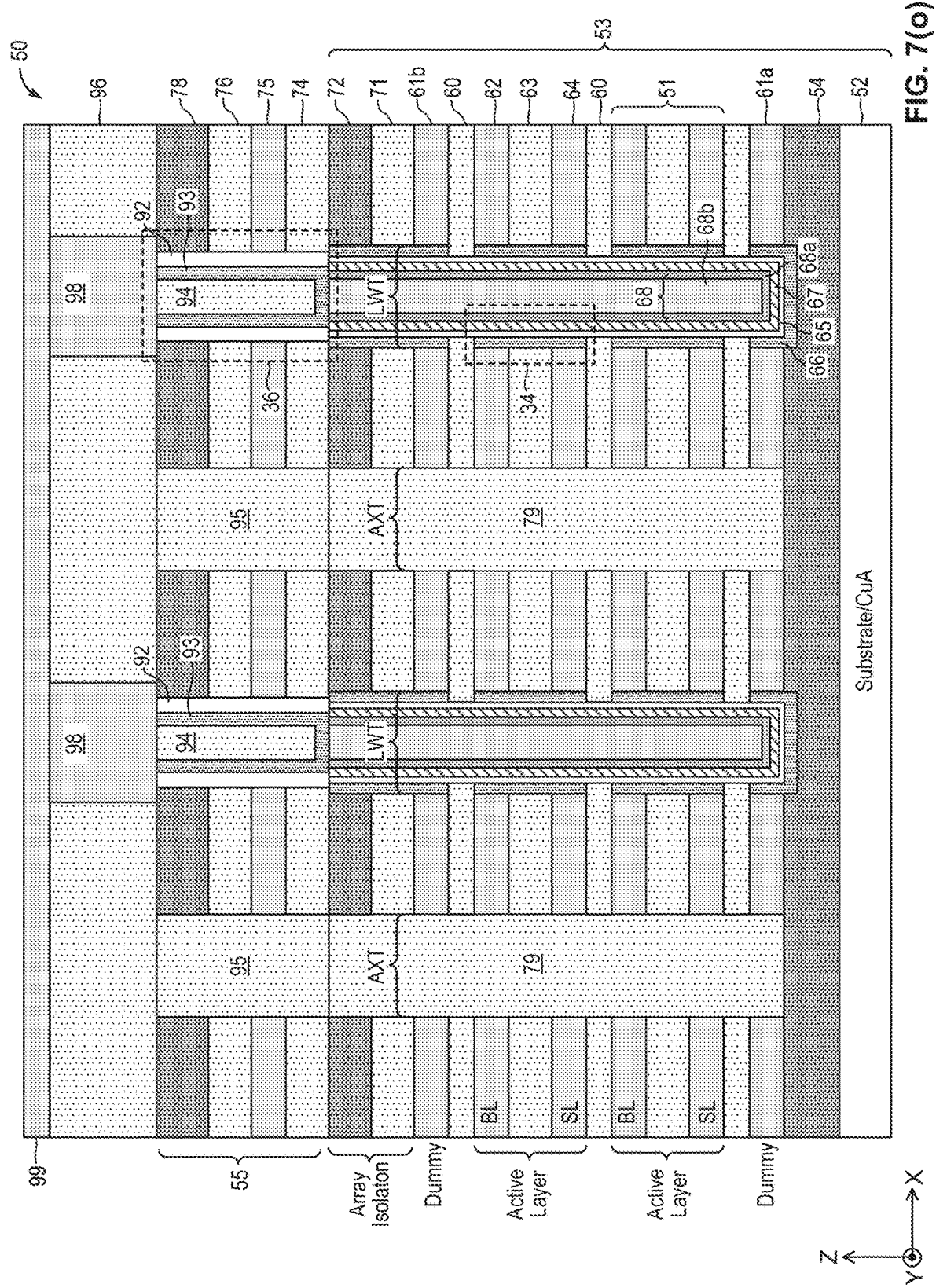

FIGS. 7(a) to 7(o), including FIGS. 7(c1), 7(c2), 7(k1), and 7(k2), illustrate the fabrication process of a memory structure including word line select transistors formed integrated with a three-dimensional memory array of memory transistors in some embodiments. Referring to FIG. 7(a), in embodiments of the present invention, the memory structure 50 includes word line select transistors that are formed on a memory array where the memory array is fabricated in the manner as described in FIG. 6 and the details will not be repeated. Like elements in FIG. 6 and FIG. 7(a) and subsequent figures are given like reference numerals and will not be further described. FIG. 7(a) includes two views: view (i) is a horizontal cross-sectional view (i.e., in an X-Y plane) along a conductive layer indicated by line A-A' in view (ii), and view (ii) is a vertical cross-sectional view (i.e., in an X-Z plane) along a plane indicated by line A-A' in view (i). FIG. 7(a) illustrates the memory array 53 of junctionless ferroelectric memory transistors as formed and described in FIG. 6. In particular, FIG. 7(a) illustrates the fabrication process where the memory array 53 is formed and view (ii) of FIG. 7(a) illustrates the top view of the memory array including active layers 51 formed in memory stacks between auxiliary trenches 79 and local word line trenches LWT in which local word line structures are formed spaced apart in the Y-direction and isolated from each other by dielectric-filled pillars 98. The part of the fabrication process relating to the word line select transistor formation process will be described with reference to FIG. 7(b) and subsequent figures.

Referring to FIG. 7(b), above the memory array 53, in particular, above the array isolation layers 71 and 72, a multi-layer structure 55 is formed by successive deposition of dielectric and conductive layers. In the present embodiment, the multi-layer structure 55 includes a first dielectric layer 74 deposited on the isolation layer 72, a conductive layer 75 deposited on the first dielectric layer 74, and a second dielectric layer 76 deposited on the conductive layer 75. A capping dielectric layer 78 is formed on the multi-layer structure. The conductive layer 75 will become the gate conductor layer which forms the gate terminals of the word line select transistors to be formed. In some embodiments, the first and second dielectric layers are silicon dioxide layers (SiO$_2$), the conductive layer 75 is a tungsten layer with a titanium-nitride liner, and the capping dielectric layer 78 is a silicon oxycarbide (SiOC) layer. In some embodiments, the first and second dielectric layers and the conductive layer 75 may each have a thickness of 30 nm or less. The sublayers of the multi-layer structure 55 may have the same or different thickness. In some embodiments, the capping dielectric layer 78 has a thickness of 40 nm or more.

Referring to FIG. 7(c), openings 80 are made in the multi-layer structure 55 to form the channel structure of the word line select transistors. In the present embodiment, the openings 80 are provided at the same periodicity as the local word line structures formed in the memory array 53. FIGS. 7(c1) and 7(c2) are top views or horizontal cross-sectional views of the multi-layer structure and illustrate two embodiments for forming openings 80. The top views are taken at the capping dielectric layer 78. Referring first to FIG. 7(c1), a mask layer may be applied to define openings 80 at the same periodicity as the local word line structures. The multi-layer structure 55 is etched, such as by using an anisotropic dry etch process, to form openings 80 which expose the local word line structures formed in the memory array underneath. In another embodiment, referring to FIG. 7(c2), the openings 80 may be formed in a two-step process. A mask layer may be applied to define trenches in the multi-layer structure overlying the local word line structures. The multi-layer structure 55 is etched, such as by using an anisotropic dry etch process, to form trenches in the multi-layer structure. Then the trenches may be filled with a dielectric layer 81. A second mask is applied to form openings 80 in the dielectric layer 81 which expose the local word line structure formed in the memory array underneath. In particular, in both the embodiments of FIGS. 7(c1) and 7(c2), the gate conductor layer in each local word line structure is exposed to be in electrical contact with the channel layer of the word line select transistor to be formed.

With the openings 80 thus formed, a gate dielectric layer 92 is deposited on the multi-layer structure 55, as shown in FIG. 7(d). In the present embodiment, the gate dielectric layer 92 is an aluminum oxide (Al$_2$O$_3$) layer. In the present embodiment, the gate dielectric layer 92 is deposited conformally, such as using an atomic layer deposition (ALD) process, and thus the gate dielectric layer 92 is formed on all exposed surfaces of the memory structure 50. Subsequent to the conformal deposition, the gate dielectric layer 92 is etched back anisotropically to remove the deposited material from the horizontal surfaces of the memory structure 50, as shown in FIG. 7(e). The gate dielectric layer 92 remains only on the sidewalls of the openings 80.

Following the gate dielectric layer, a channel layer 93 is deposited. In some embodiments, the channel layer is formed by a two-step deposition process. A first optional deposition process uses a room temperature physical vapor deposition (PVD) process. For example, a PVD IGZO layer may be deposited at room temperature. The room temperature PVD deposition is preferred as it will avoid oxidizing the exposed metal in the gate conductor layer of the local word line structure underneath. Typically, the PVD deposition is non-conformal and will be deposited on the horizontal surface of the memory structure only, not on the vertical sidewalls of the openings. In this manner, the PVD IGZO will be deposited onto the exposed gate conductor layer 68 of the local word line structure, which facilitates contact with the metal layer of the gate conductor layer 68. The second deposition process uses an atomic layer deposition (ALD) technique to deposit the channel material. For example, an ALD IGZO layer may be deposited conformally on the memory structure 50, resulting in the channel layer 93, as shown in FIG. 7(f).

Then, a filler dielectric layer 94 is deposited on the surface of the memory structure 50, while also filling the remaining volume of the openings 80, as shown in FIG. 7(g). For example, the filler dielectric layer 94 can be a silicon dioxide ($SiO_2$) layer. After the deposition step, excess material is removed from the top of memory structure 50 using, for example, chemical-mechanical polishing (CMP). The resulting memory structure 50 is shown in FIG. 7(h). In particular, the polishing step stops on the channel layer 93, leaving the channel layer atop the memory structure connecting to all the channel structures formed in the openings 80.

A channel layer separation process is carried out to remove the channel layer material on the memory structure 50, as shown in FIG. 7(i). In one embodiment, the channel layer is an oxide semiconductor material, such as IGZO, and the channel layer separation process is performed by a wet etch process.

Then, a select gate separation process is performed to isolate the gate conductive layer 75 of the word line select transistors to each memory stack. Referring to FIG. 7(j), trenches 84 are formed in the multi-layer structure 55 which extend in the Y-direction to isolate the multi-layer structure 55 to each memory stack. In the present embodiment, trenches 84 are aligned with the location of each auxiliary trench 79. As thus formed, the gate conductive layer 75 is formed into strips, each strip being associated with a memory stack of the memory array. Subsequently, trenches 84 are filled with a dielectric layer 95, such as a silicon oxide layer ($SiO_2$), as shown in FIG. 7(k). Word line select transistors 36 are formed at the intersection of each strip of gate conductive layer 75 and the channel structure including gate dielectric layer 92 and the channel layer 93.

FIGS. 7(k1) and 7(k2) are top views or horizontal cross-sectional views of the multi-layer structure and illustrate the resulting structure after the select gate separation process for the two embodiments shown in respective FIGS. 7(c1) and 7(c2). In particular, FIGS. 7(k1) and 7(k2) illustrate the horizontal cross-sectional views of the word line select transistors at the gate conductor layer 75. Referring first to FIG. 7(k1), channel structures of the word line select transistors are formed at locations where local word line structures are formed in the memory array. Dielectric filled trenches 95 isolates the multi-layer structure into sections. In the embodiment shown in FIG. 7(k1), the gate conductor layer 75 is contiguous over two memory stacks. That is, the gate conductor layer 75 surrounds the channel structure and is associated with two adjacent memory stacks between two adjacent auxiliary trenches. In the embodiment shown in FIG. 7(k2), the gate conductor layer 75 is isolated already by the previously formed trenches. The select gate separation process further isolate the gate conductor layer 75 into strips by the dielectric filled trenches 95, overlaying each memory stack. That is, the gate conductor layer 75 is formed adjacent to the channel structure formed spaced apart by the dielectric filled pillars 81.

The fabrication of the word line select transistors continues with forming the drain terminal. A top insulation layer 96 is deposited on the memory structure 50, as shown in FIG. 7(l). For example, the top insulation layer 96 is a silicon dioxide layer ($SiO_2$). Then, as shown in FIG. 7(m), openings 82 are made to exposed the channel structures formed in the multi-layer structure 55. Then, the openings 82 is filled with a conductive material to form conductive via structures 98, as shown in FIG. 7(n). In one example, the conductive material is copper. Finally, a conductive layer 99 is deposited on the memory structure 50 and patterned to form global word lines, as shown in FIG. 7(o). The drain terminals of the word line select transistors 36 are thus formed.

Figure 8A:
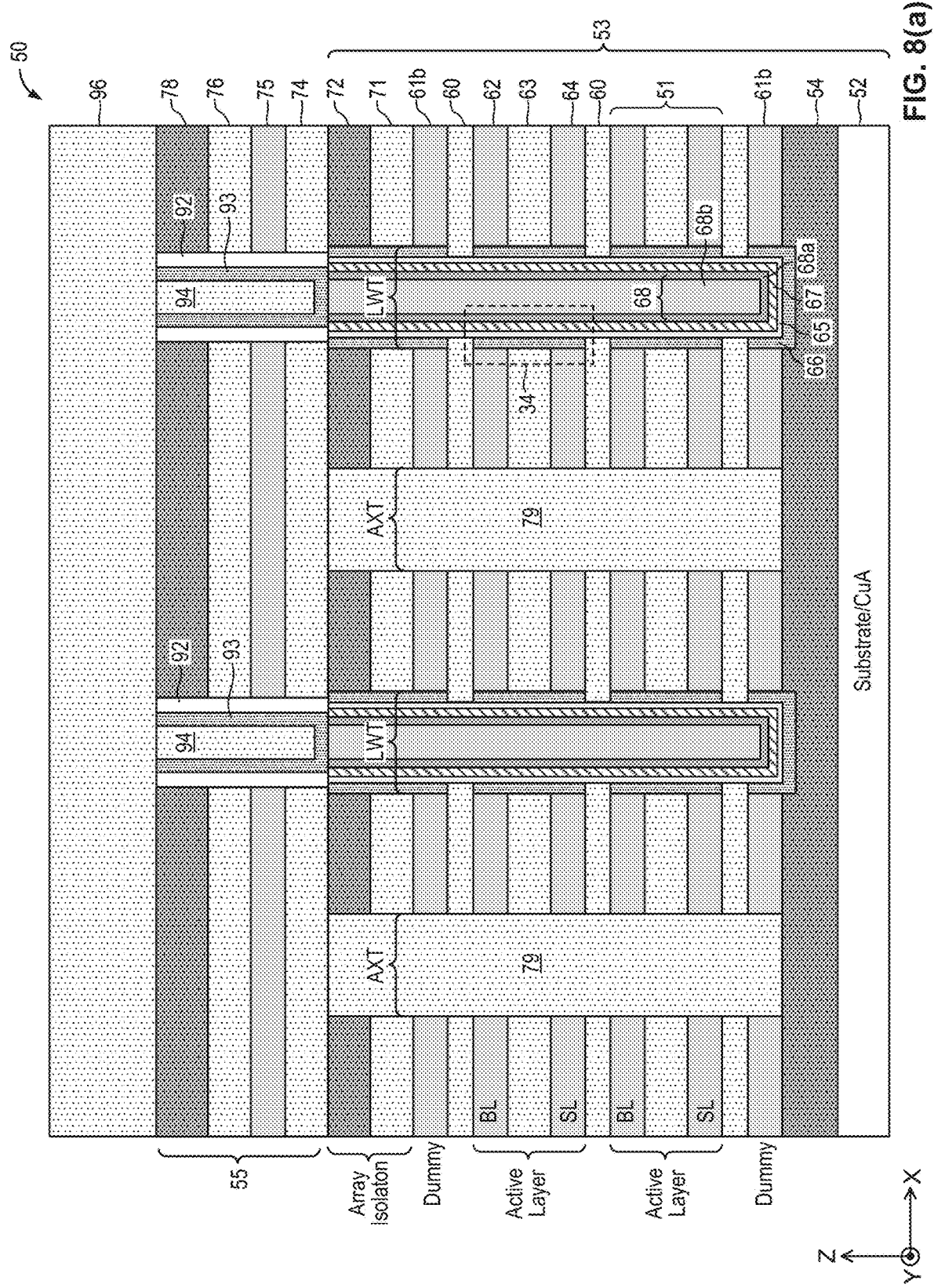
Figure 8B:
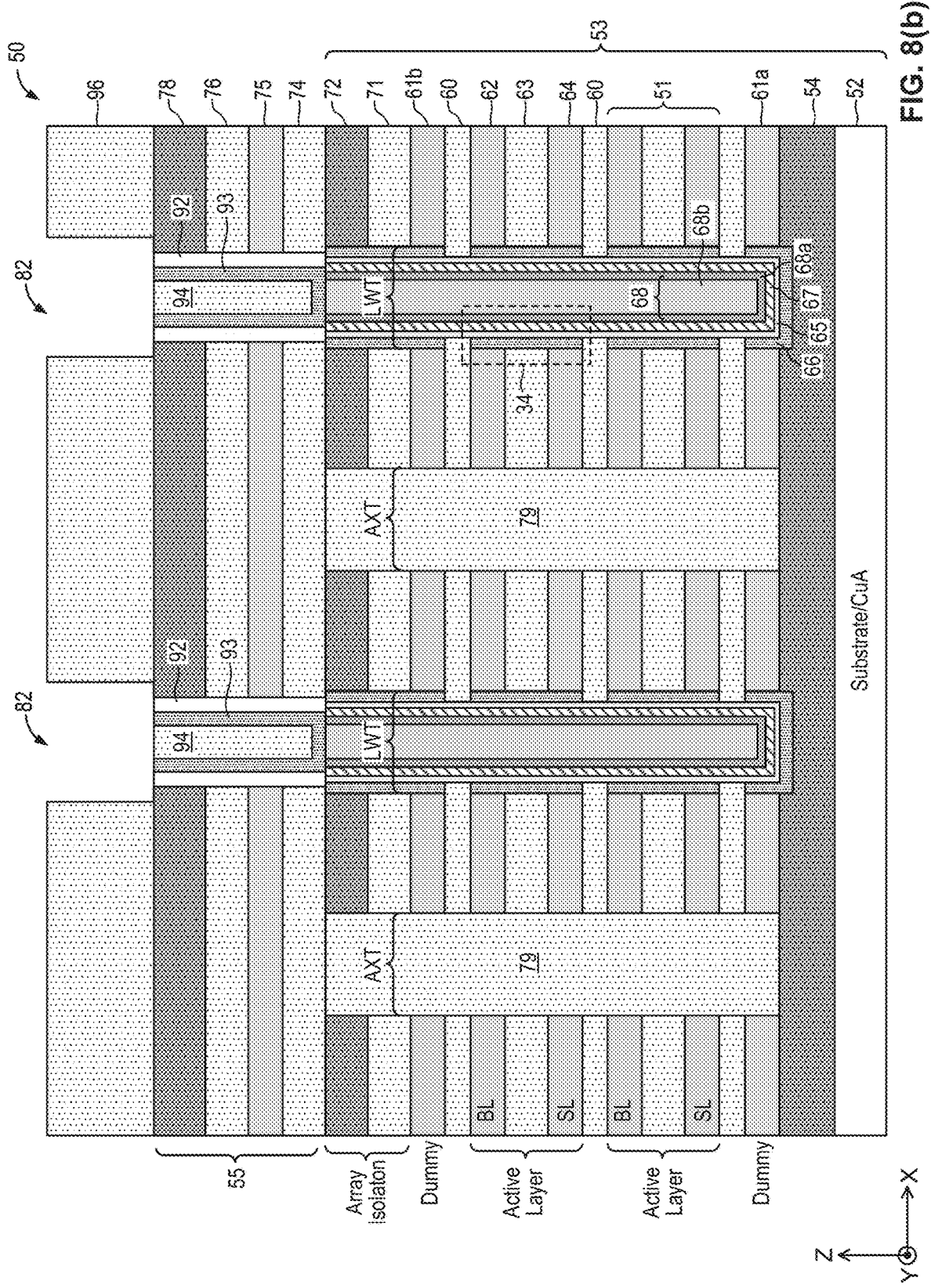
Figure 8C:
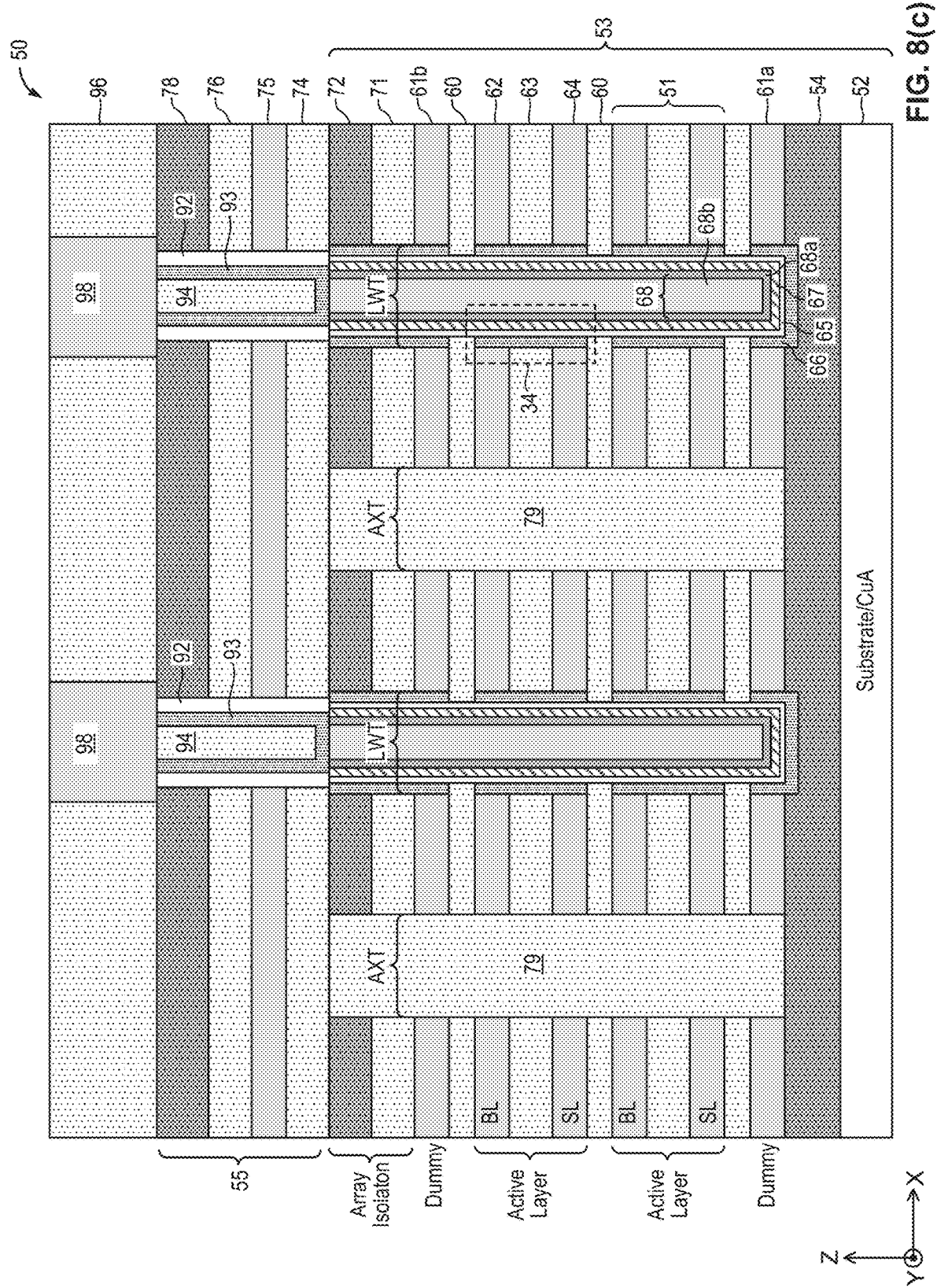

FIGS. 8(a) to 8(f) illustrate an alternate process for performing the select gate separation in alternate embodiments. Referring to FIG. 8(a), the fabrication process has completed the formation of the multi-layer structure 55 and the channel structures, such as shown in FIG. 7(i). Thereafter, the top insulation layer 96 is deposited. Then, as shown in FIG. 8(b), openings 82 are made to exposed the channel structures formed in the multi-layer structure 55. Then, the openings 82 is filled with a conductive material to form conductive via structures 98, as shown in FIG. 8(c). In one example, the conductive material is copper.

Figure 8E:
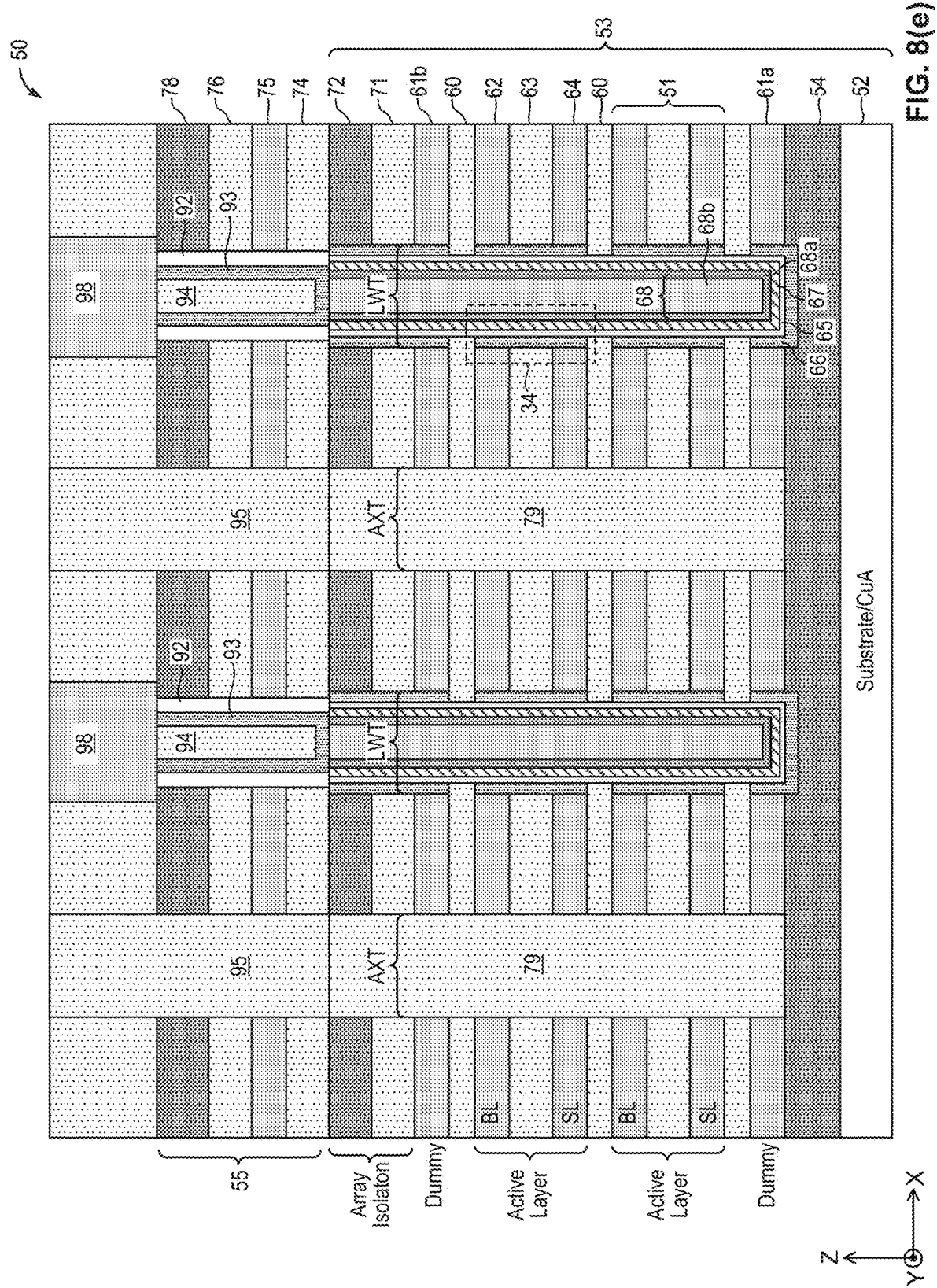
Figure 8F:
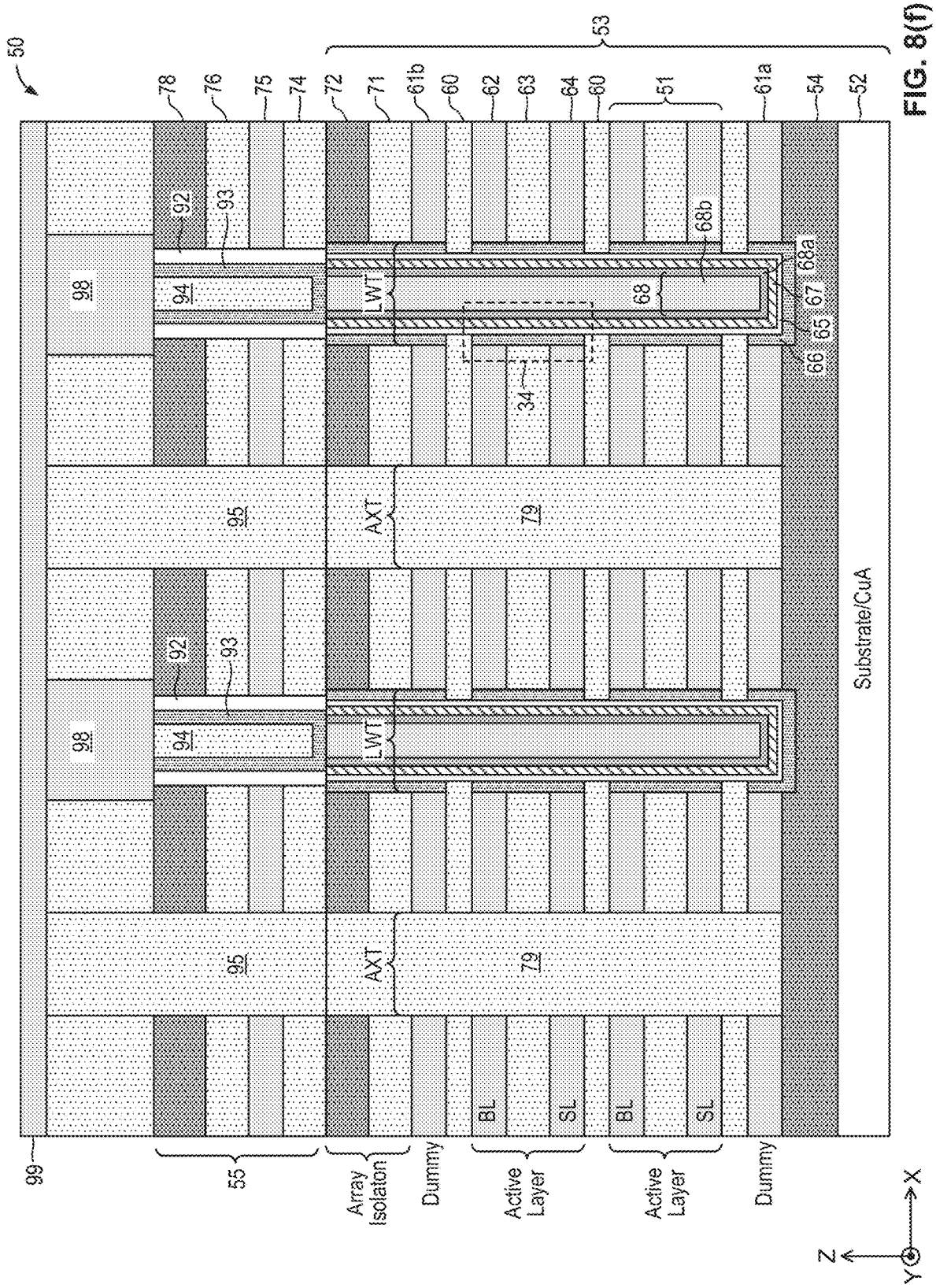

At this point, trenches 84 are formed in the multi-layer structure 55 which extend in the Y-direction to isolate the multi-layer structure 55 to each memory stack, as shown in FIG. 8(d). Subsequently, trenches 84 are filled with a dielectric layer 95, such as a silicon oxide layer ($SiO_2$), as shown in FIG. 8(e). Finally, a conductive layer 99 is deposited on the memory structure 50 and patterned to form global word lines, as shown in FIG. 8(f). The drain terminals of the word line select transistors 36 are thus formed.

In this detailed description, process steps described for one embodiment may be used in a different embodiment, even if the process steps are not expressly described in the different embodiment. When reference is made herein to a method including two or more defined steps, the defined steps can be carried out in any order or simultaneously, except where the context dictates or specific instruction otherwise are provided herein. Further, unless the context dictates or express instructions otherwise are provided, the method can also include one or more other steps carried out before any of the defined steps, between two of the defined steps, or after all the defined steps.

In this detailed description, various embodiments or examples of the present invention may be implemented in numerous ways, including as a process; an apparatus; a system; and a composition of matter. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. A memory circuit, comprising:
an array of thin-film ferroelectric memory transistors formed by a plurality of NOR memory strings intersecting with a plurality of local word line structures, the plurality of NOR memory strings being arranged in multiple stacks of vertically aligned NOR memory strings, each memory string comprising a common drain line and a common source line;
the plurality of local word line structures comprising groups of local word line structures, the local word line structures in each respective group being arranged along the NOR memory strings of at least one stack, each local word line structure extending vertically along the vertically aligned NOR memory strings in the at least one stack and comprising a channel and a gate conductor separated by a ferroelectric gate dielectric layer, wherein the ferroelectric memory transistors are formed at each intersection of a respective local word line structure and the common drain line and the common source line of a respective NOR memory string, the gate conductor of each local word line structure serving as a common gate terminal for the memory transistors in the vertically aligned NOR memory strings in the respective stack intersecting the respective local word line structure;
a plurality of global word lines arranged orthogonal to the plurality of NOR memory strings, each global word line being aligned with a set of local word line structures provided across the multiple stacks; and
a plurality of word line select transistors comprising groups of word line select transistors, each group being arranged along the NOR memory strings of the stacks, each word line select transistors being provided between a respective local word line structure and an associated global word line and comprising a source terminal being the gate conductor of the associated local word line structure, a drain terminal coupled to the associated global word line, and a gate terminal coupled to receive a respective select gate signal, each group of word line select transistors being controlled by the same select gate signal,
wherein in response to a global word line being asserted to select a set of local word line structures associated therewith, a respective group of word line select transistors is activated by the respective select gate signal to electrically connect the asserted global word line to the common gate terminal of the associated local word line structure to activate one local word line structure in the set of local word line structures.

2. The memory device of claim 1, wherein the plurality of word line select transistor are thin-film transistors, each word line select transistor comprising a channel layer and a gate dielectric layer, the gate dielectric layer formed between the channel layer and the gate terminal, the channel layer of the word line select transistors and the channel layer of the memory transistors are formed of the same material.

3. The memory device of claim 1, wherein respective groups of word line select transistors have channel structures overlying and having a same periodicity as the local word line structures associated therewith, each of the channel structures comprising a gate dielectric layer surrounding a channel layer.

4. The memory device of claim 3, wherein the gate terminals of the plurality of word line select transistors comprise conductive layers formed overlying the stacks of NOR memory strings, each conductive layer contacting the channel structures in each respective groups of word line select transistors.

5. The memory device of claim 3, wherein the gate terminals of the plurality of word line select transistors comprise conductive layers formed overlying the stacks of NOR memory stings and surrounding the channel structures in each respective groups of word line select transistors.

6. The memory device of claim 1, wherein a first global word line is asserted to select a first subset of ferroelectric memory transistors that are formed across the plurality of stacks of NOR memory strings and intersecting with a first set of local word line structures, and a first group of word line select transistors is activated to select a second subset of ferroelectric memory transistors in the first subset of memory transistors associated with the activated local word line structure, remaining ferroelectric memory transistors in the first subset remains unselected.

7. The memory device of claim 6, wherein the second subset of memory transistors comprises memory transistors in a stack of NOR memory string associated with the first set of local word line structures having the gate conductor electrically connected to the asserted first global word line through the first group of word line select transistors.

8. The memory device of claim 6, wherein the second subset of memory transistors comprises memory transistors in two stacks of NOR memory string associated with the first set of local word line structures having the gate conductor electrically connected to the asserted first global word line through the first group of word line select transistors.

9. The memory device of claim 1, wherein each NOR memory string in a respective stack is isolated from an adjacent NOR memory string in the same stack by an insulating layer.

10. The memory device of claim 1, wherein in each local word line structure, the channel layer is formed adjacent each NOR memory string in the stack and is discontinuous between adjacent NOR memory stings.

11. The memory device of claim 1, wherein the array of ferroelectric memory transistors is organized into a plurality of pages of ferroelectric memory transistors, and a global word line is asserted to select a set of local word line structures aligned with the global word line, a first subset of word line select transistors are activated by the respective select gate signals to electrically connect the asserted global word line to the common gate terminals of the associated local word line structures to activate the local word line structures associated with a given page of ferroelectric memory transistors.

12. A three-dimensional memory structure formed above a planar surface of a semiconductor substrate, the memory structure comprising:
an array of thin-film ferroelectric memory transistors being organized as a plurality of stacks of NOR memory strings, each stack being separated from each of its immediately neighboring stacks along a first direction by a trench, the plurality of stacks extending along a second direction substantially parallel to the planar surface of the semiconductor substrate, the NOR memory strings of each stack being provided one on top of another along a third direction substantially normal to the planar surface, each NOR memory string comprising a common drain layer formed spaced apart from a common source layer, local word line structures being provided in contact with the stacks of NOR memory strings and arranged spaced apart in the second direction, each local word line structure extending in the third direction and comprising a channel layer in contact with the NOR memory strings in the associated stack, a ferroelectric gate dielectric layer formed adjacent the channel layer and a gate conductor layer provided in the local word line structures adjacent the ferroelectric gate dielectric layer, the gate conductor layer of each local word line structure serving as a common gate terminal for the ferroelectric memory transistors in the NOR memory strings in a respective stack associated with the local word line structure; and a plurality of word line select transistors, each word line select transistor being associated with a given local word line structure, each word line select transistor comprising a source terminal being the gate conductor layer of the associated local word structure, a drain terminal coupled to one of a plurality of global word lines, and a gate terminal coupled to receive a respective select gate signal, wherein in response to a first global word line of the plurality of global word lines being asserted to select a set of local word line structures associated therewith, a first word line select transistor is activated by a first select gate signal to electrically connect the asserted first global word line to the common gate terminal of the associated local word line structure to activate one local word line structure in the set of local word line structures.

13. The three-dimensional memory structure of claim 12, wherein the ferroelectric memory transistors in each memory string comprise drain terminals formed by the common drain layer as a bit line, source terminals formed by the common source layer, and gate terminals formed by the gate conductor layers of the local word line structures in contact with the memory string, each memory transistor being formed at the intersection of the memory string and a local word line structure.

14. The three-dimensional memory structure of claim 12, wherein the plurality of word line select transistor are thin-film transistors, each word line select transistor comprising a channel layer and a gate dielectric layer, the gate dielectric layer formed between the channel layer and the gate conductor layer, the channel layer of the word line select transistors and the channel layer of the memory transistors are formed of the same material.

15. The three-dimensional memory structure of claim 12, wherein the plurality of global word lines extends in the first direction and have the same periodicity as the local word line structures.

16. The three-dimensional memory structure of claim 12, wherein the first global word line is asserted to select a first subset of ferroelectric memory transistors that are formed across the plurality of stacks of NOR memory strings and intersecting with a first set of local word line structures, and a first group of word line select transistors is activated to select a second subset of ferroelectric memory transistors in the first subset of memory transistors associated with the activated local word line structure, remaining ferroelectric memory transistors in the first subset remains unselected.

17. The three-dimensional memory structure of claim 16, wherein the second subset of memory transistors comprises memory transistors in a stack of NOR memory string associated with the first set of local word line structures having the gate conductor layers electrically connected to the asserted first global word line through the word line select transistors in the first group.

18. The three-dimensional memory structure of claim 16, wherein the second subset of memory transistors comprises memory transistors in two stacks of NOR memory string associated with the first set of local word line structures having the gate conductor layers electrically connected to the asserted first global word line through the word line select transistors in the first group.

19. The three-dimensional memory structure of claim 12, wherein the plurality of word line select transistors comprise groups of word line select transistors, each group being arranged along the NOR memory strings of the stacks, and wherein the plurality of word line select transistors have channel structures overlying and having a same periodicity as the local word line structures, each of the channel structures comprising a gate dielectric layer surrounding a channel layer.

20. The three-dimensional memory structure of claim 19, wherein the gate terminals of the plurality of word line select transistors comprise conductive layers formed overlying the stacks of NOR memory strings, each conductive layer contacting the channel structures in each respective groups of word line select transistors.

21. The three-dimensional memory structure of claim 19, wherein the gate terminals of the plurality of word line select transistors comprise conductive layers formed overlying the stacks of NOR memory stings and surrounding the channel structures in each respective groups of word line select transistors.

* * * * *